(12) United States Patent
Korolev et al.

(10) Patent No.: US 7,068,943 B2
(45) Date of Patent: *Jun. 27, 2006

(54) DEVICES AND METHODS FOR DYNAMIC DISPERSION COMPENSATION

(75) Inventors: Andrey E. Korolev, St. Petersburg (RU); Dmitri V. Kuksenkov, Painted Post, NY (US); Shenping Li, Painted Post, NY (US); Daniel A. Nolan, Corning, NY (US); Michael Sauer, Corning, NY (US); Alexej Sysoliatin, Moscow (RU)

(73) Assignee: Corning Incorporated, Corning, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 10/778,979

(22) Filed: Feb. 13, 2004

(65) Prior Publication Data
US 2004/0184815 A1   Sep. 23, 2004

Related U.S. Application Data

(60) Provisional application No. 60/447,174, filed on Feb. 13, 2003.

(51) Int. Cl.
*H04B 10/12* (2006.01)

(52) U.S. Cl. ............ 398/148; 398/147; 398/149; 398/158; 398/159; 398/160; 398/79; 398/81; 398/92; 385/24; 385/27; 385/37; 385/123; 385/122; 385/124; 385/147

(58) Field of Classification Search ............ 398/81, 398/29, 79, 92, 13, 147, 148, 158, 159, 149, 398/160; 385/24, 27, 37, 123, 147, 122, 385/124
See application file for complete search history.

(56) References Cited

U.S. PATENT DOCUMENTS

| | | | | |
|---|---|---|---|---|
| 5,504,829 A | * | 4/1996 | Evans et al. ............... | 385/123 |
| 5,636,046 A | * | 6/1997 | Ishikawa et al. ........... | 398/147 |
| 5,801,862 A | * | 9/1998 | Desurvire et al. .......... | 398/80 |
| 5,925,163 A | | 7/1999 | Evans et al. ............... | 65/377 |
| 5,956,440 A | * | 9/1999 | Mikami et al. ............. | 398/81 |
| 6,097,870 A | * | 8/2000 | Ranka et al. ............... | 385/127 |
| 6,301,934 B1 | | 10/2001 | Dobbins ..................... | 65/381 |
| 6,307,985 B1 | * | 10/2001 | Murakami et al. ......... | 398/147 |
| 6,407,841 B1 | * | 6/2002 | Golovchenko et al. .... | 398/92 |
| 6,459,374 B1 | | 10/2002 | Rand et al. ................. | 340/568.2 |
| 6,546,158 B1 | | 4/2003 | Fondeur et al. ............ | 385/3 |

(Continued)

OTHER PUBLICATIONS

Fiber Optics Handbook, McGraw-Hill 2002, Titled Solitons in Optical Fiber Communication Systems by P. V. Mamyshev; Chapter 7.

(Continued)

*Primary Examiner*—Hanh Phan
(74) *Attorney, Agent, or Firm*—Svetlana Z. Short

(57) ABSTRACT

The present invention provides devices and methods for dynamic dispersion compensation. According to one embodiment of the invention, a dispersion compensating device includes a negative dispersion fiber having an input configured to receive the optical signal, the negative dispersion fiber having a length and dispersion sufficient to remove any positive chirp from each wavelength channel of the optical signal, thereby outputting a negatively chirped optical signal; an amplifying device configured to amplify the negatively chirped optical signal; and a nonlinear positive dispersion fiber configured to receive the negatively chirped optical signal. The devices of the present invention provide broadband compensation for systems having a wide range of variable residual dispersions.

16 Claims, 17 Drawing Sheets

U.S. PATENT DOCUMENTS

| | | | |
|---|---|---|---|
| 6,633,713 B1 * | 10/2003 | Tirloni et al. | 385/123 |
| 6,661,958 B1 * | 12/2003 | Hirano et al. | 385/127 |
| 6,687,433 B1 * | 2/2004 | Okuno et al. | 385/27 |
| 6,721,481 B1 * | 4/2004 | Terahara et al. | 385/122 |
| 6,865,328 B1 * | 3/2005 | Berkey et al. | 385/123 |
| 2002/0054726 A1 | 5/2002 | Fondeur et al. | 385/15 |
| 2002/0131132 A1 * | 9/2002 | Tanaka et al. | 359/179 |
| 2002/0168160 A1 * | 11/2002 | Hirano et al. | 385/123 |

OTHER PUBLICATIONS

Nonlinear Fiber Optics (Third Edition); Govind P. Agrawal; Academic Press.

Journal of Lightwave Technology, vol. 9, May of 1991; A Single-Mode Fiber with Chromatic Dispersion Varying Along the Length; pp. 561-566; Bogatyrev et al.

Electronics Letters; May 28, 1998, vol. 34; No. 11; pp. 1135-1136; Titled Noise Reduction of 20 Gbit/s pulse train using spectrally filtered optical solitons; M. Asobe, et al.

'91 Optical Society of America; vol. 8; No. 2/Feb. 1991; P. L. Francois; Titled Nonlinear propagation of ultrashort pulses in optical fibers: total field formulation in the frequency domain.

* cited by examiner

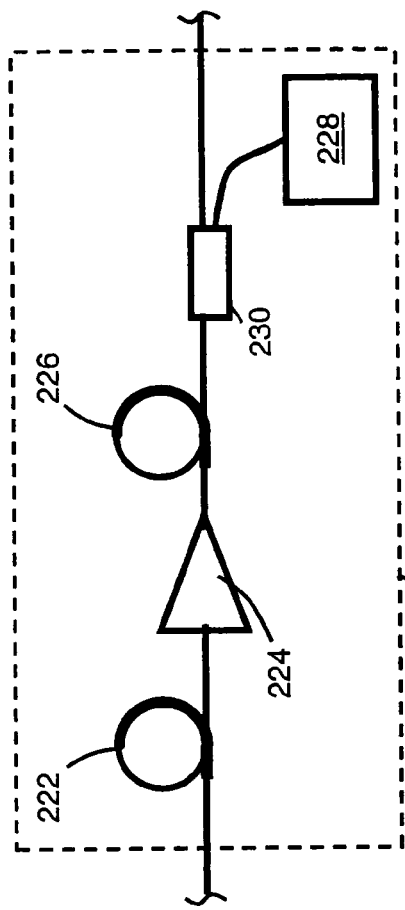
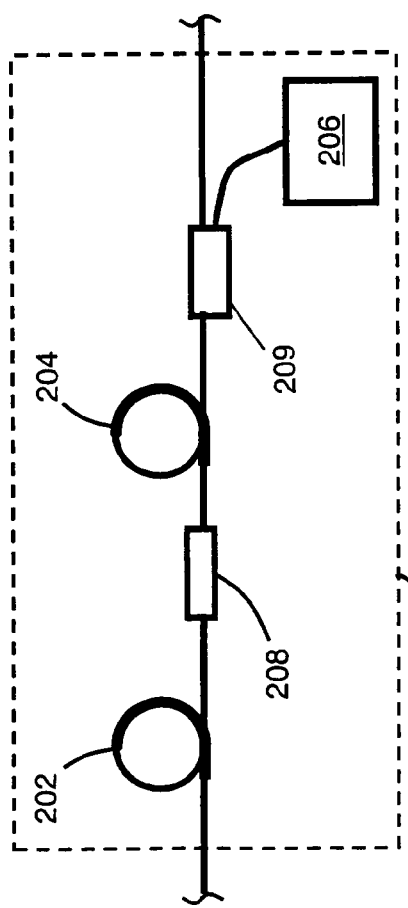

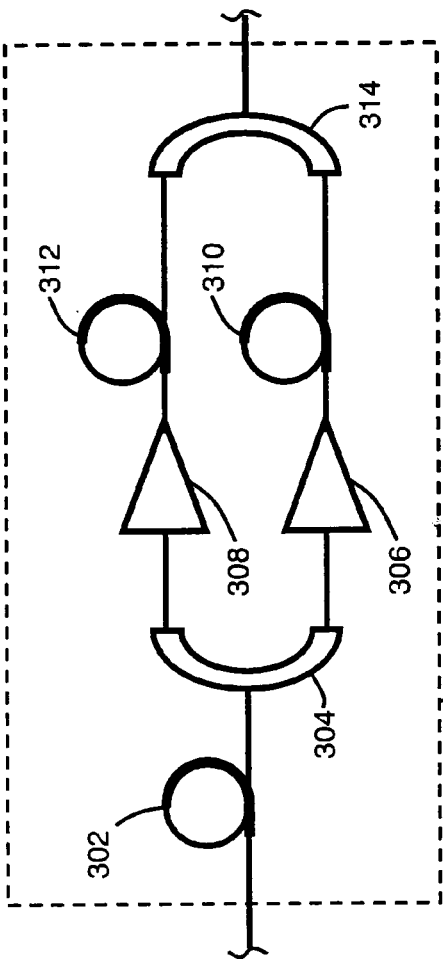
FIG. 10
FIG. 9
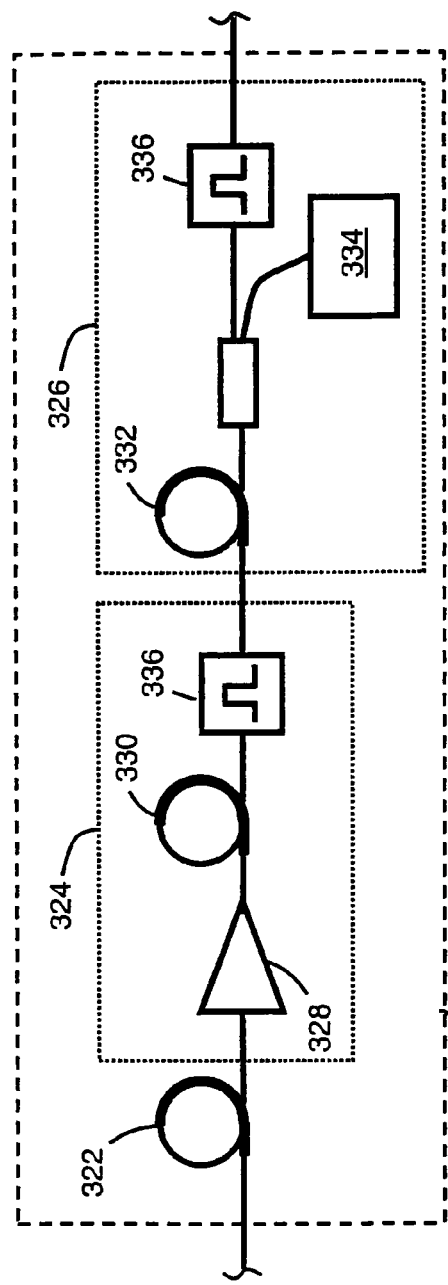
FIG. 11

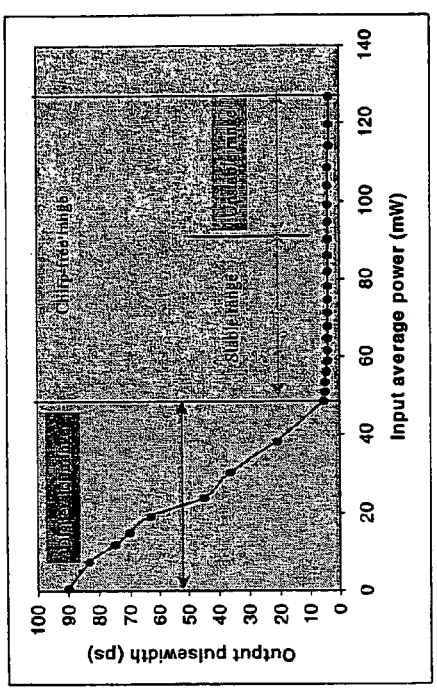
FIG. 24
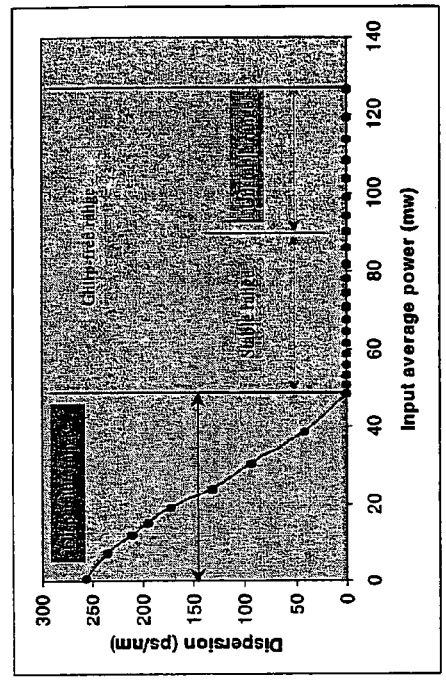
FIG. 25
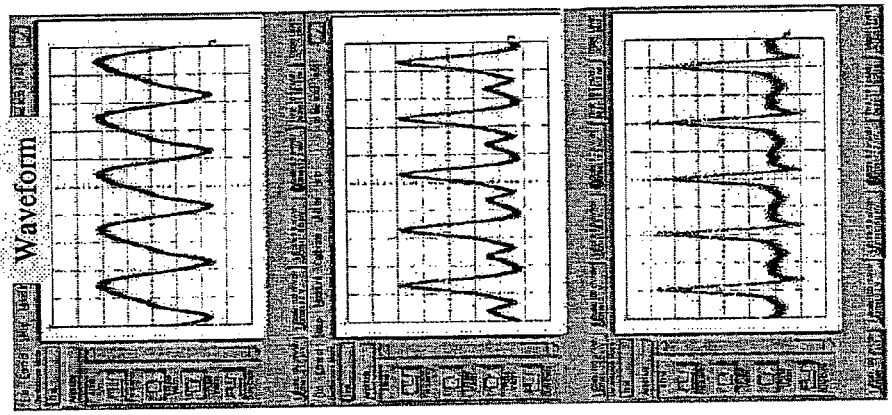
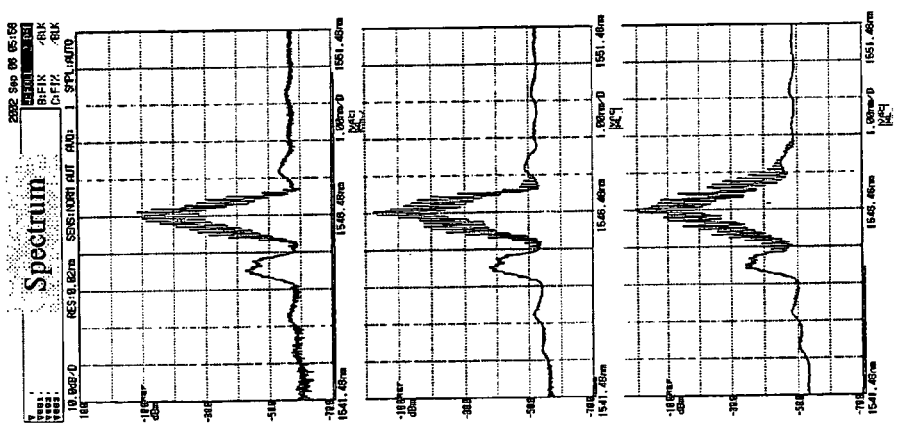
FIG. 23

DEVICES AND METHODS FOR DYNAMIC DISPERSION COMPENSATION

This application claims the benefit of priority under 35 U.S.C. § 119(e) of U.S. Provisional Application Ser. No. U.S. 60/447,174 filed on U.S. Parent Provisional Application Filing Feb. 13, 2003 the content of which is relied upon and incorporated herein by reference in its entirety.

BACKGROUND OF THE INVENTION

1. Field of the Invention

The present invention relates generally to optical communications, and more specifically to devices and methods providing dispersion compensation of an optical signal.

2. Technical Background

As the bit rates of optical communications systems increase, the deleterious effects of dispersion in the optical fibers used in long-distance transmission become increasingly important. Dispersion causes an optical pulse to spread out in time; the longer wavelength components of the pulse travel along the fiber at a different rate than do the shorter wavelength components of the pulse. Typically, long-distance transmission fibers (e.g. LEAF®, available from Corning Incorporated of Corning, N.Y.) have a small but non-negligible positive dispersion, causing the shorter wavelength components to arrive at a network node before the longer wavelength components. Such a pulse is said to be positively chirped. This temporal spreading can cause loss of signal fidelity and an increase in bit error rate.

Conventional methods of dispersion compensation use dispersion compensating fiber to reverse the effects of dispersion in the transmission fiber. Dispersion compensating fiber typically has a large negative dispersion to counteract the positive dispersion of the transmission fiber. In one type of conventional dispersion compensating device, a dispersion compensating fiber is packaged on a spool in a module. The length and dispersion properties of the dispersion compensating fiber are chosen to balance the dispersion of the span of transmission fiber to which it is coupled. A positively chirped optical signal from the transmission fiber is propagated through the dispersion compensating fiber, and the negative dispersion of the dispersion compensating fiber removes the positive chirp from the optical signal, forming a signal with essentially no chirp. While such conventional methods are relatively simple to implement, they are limited in that they are passive; the dispersion compensation properties of such passive dispersion compensation devices are determined by the length and dispersion properties of the dispersion compensating fiber. If the chirp of the incoming optical signal is substantially different than that for which the device was designed, the device will be ineffective at providing an essentially chirp-free optical signal. Such devices are also generally unable to remove all of the chirp of the optical signal, imposing a residual dispersion on the transmission link. In an optical communications system with large distances of transmission fiber and multiple passive dispersion compensation devices, the residual dispersion can have a significant impact on the quality of the optical signal. Residual dispersion is especially damaging in long-distance (e.g. >1000 km) 10 Gb/s systems as well as in 40 Gb/s systems.

Wavelength division multiplexing (WDM) techniques have become ubiquitous in optical communications. As such, optical signals typically have a plurality of wavelength channels over a relatively broad (e.g. tens of nanometers) range of wavelengths. It is therefore desirable for dispersion compensating devices to provide dispersion compensation over a broad range of wavelengths. Conventional grating-based devices and planar waveguide-based devices provide controllable dispersion compensation only over a relatively narrow band of wavelengths, and are very expensive to produce. Micro-optic-based dispersion compensators have also been proposed. While these devices can provide broadband compensation, they suffer from high excess loss and low reliability.

SUMMARY OF THE INVENTION

One embodiment of the present invention relates to a dispersion compensating device for an optical signal having at least one wavelength channel lying within a wavelength range, the dispersion compensating device including a negative dispersion fiber having an input configured to receive the optical signal, the negative dispersion fiber having a length and a dispersion sufficient to remove any positive chirp from each wavelength channel of the optical signal, thereby outputting a negatively chirped optical signal; a nonlinear positive dispersion fiber configured to receive the negatively chirped optical signal, the nonlinear positive dispersion fiber having a total dispersion of greater than about 100 ps/nm at a wavelength within the wavelength range; and a Raman pump source operatively coupled to the nonlinear positive dispersion fiber, the Raman pump source being configured to amplify the optical signal in the nonlinear positive dispersion fiber.

Another embodiment of the present invention relates to a dispersion compensating device for an optical signal having at least one wavelength channel lying within a wavelength range, the dispersion compensating device including a negative dispersion fiber having an input configured to receive the optical signal, the negative dispersion fiber having a length and a dispersion sufficient to remove any positive chirp from each wavelength channel of the optical signal, thereby outputting a negatively chirped optical signal; a nonlinear positive dispersion fiber configured to receive the negatively chirped optical signal; and a Raman pump source operatively coupled to the nonlinear positive dispersion fiber, the Raman pump source being configured to amplify the optical signal in the nonlinear positive dispersion fiber, wherein the amplification provided by the Raman pump source is about equivalent to the loss of the nonlinear positive dispersion fiber at a wavelength within the wavelength range.

Another embodiment of the present invention relates to a dispersion compensating device for an optical signal having at least one wavelength channel lying within a wavelength range, the dispersion compensating device including a negative dispersion fiber having an input configured to receive the optical signal, the negative dispersion fiber having a length and a dispersion sufficient to remove any positive chirp from each wavelength channel of the optical signal, thereby outputting a negatively chirped optical signal; an amplifying device configured to amplify the negatively chirped optical signal; and a nonlinear positive dispersion fiber having an end configured to receive the amplified negatively chirped optical signal, the nonlinear positive dispersion fiber having a variable dispersion over its length.

Another embodiment of the present invention relates to a dispersion compensating device for an optical signal having at least one wavelength channel lying within a wavelength range, the dispersion compensating device including a negative dispersion fiber having an input configured to receive the optical signal, the negative dispersion fiber having a length and a dispersion sufficient to remove any positive chirp from each wavelength channel of the optical signal, thereby outputting a negatively chirped optical signal; and a plurality of compensation stages, each compensation stage including an amplifying device operatively coupled to a nonlinear positive dispersion fiber.

The devices and methods of the present invention result in a number of advantages over prior art devices and methods. For example, the present invention provides a dispersion compensating device that can provide broadband compensation of a wavelength division multiplexed optical signal. The dispersion compensating devices, systems and methods of the present invention can effectively compress pulses having a wide range of chirps, thereby providing compensation for a wide range of residual dispersion values. The dispersion compensating devices, systems and methods of the present invention provide compression of pulses having a wide dynamic range of pulse widths and peak powers. The devices are fiber-based, and therefore do not suffer from high insertion losses associated with coupling energy into planar or micro-optic devices. The devices, systems and methods of the present invention rely on a nonlinear effect to provide dynamic compensation; as such, the device will react quickly to changes in the chirp of the optical signal. The dispersion compensating devices of the present invention can also provide gain to an optical signal. The devices and methods of the present invention are especially useful for compensation of residual dispersion in long-distance 10 Gb/s and in 40 Gb/s RZ (return to zero) optical communications systems.

Another advantage of the dispersion compensation device of the present invention is that it is dynamic over a broad spectral band. That is, it is capable of simultaneously compensating for variable amounts of chromatic dispersion in several different spectral channels of the WDM system covering a spectral band with a width of at least 30 nm.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

BRIEF DESCRIPTION OF THE DRAWINGS

FIG. 2 is a schematic view of a dispersion compensating device including a Raman pump source according to one embodiment of the present invention;

FIG. 3 is a schematic view of a dispersion compensating device including both a discrete amplifier and a Raman pump source according to one embodiment of the present invention;

FIG. 9 is a schematic view of a dispersion compensating device including a spectral filter according to one embodiment of the present invention;

FIG. 10 is a schematic view of a dispersion compensating device including a pair of interleavers according to one embodiment of the present invention;

FIG. 11 is a schematic view of a dispersion compensating device including two compensation stages according to one embodiment of the invention;

FIG. 23 is a set of spectra and waveforms for different amplified signal powers in the experiment of FIG. 2;

FIGS. 24 and 25 are plots of pulsewidth and dispersion, respectively, vs. amplified signal power for the experiment of Example 3;

DEFINITIONS

The following definitions are in accord with common usage in the art.

The refractive index profile is the relationship between refractive index and optical fiber radius.

Delta, $\Delta$, is the relative refractive index percent, $\Delta=(n_i^2-n_c^2)/2n_c^2$, where $n_i$ is the specified refractive index in region i, and $n_c$ is the average refractive index of the cladding region. Deltas are conventionally expressed as percents.

DETAILED DESCRIPTION OF THE PREFERRED EMBODIMENTS

The disclosure of U.S. Provisional Patent Application Ser. No. 60/418,080 is hereby incorporated herein by reference in its entirety.

Figure 1:
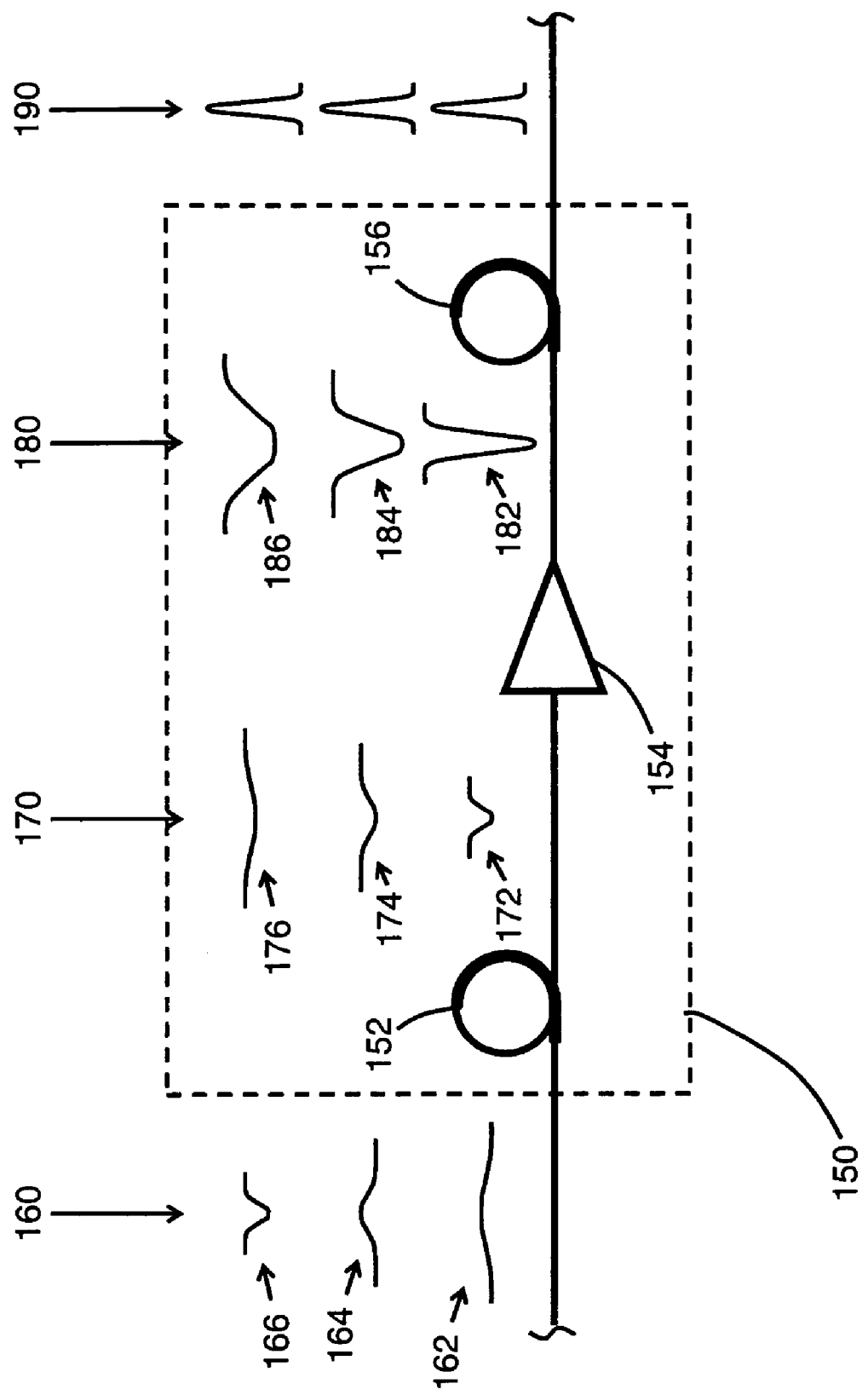
FIG. 1 is a schematic view of a dispersion compensating device according to one embodiment of the present invention.

One aspect of the present invention relates to a dispersion compensating device including a negative dispersion fiber, an amplifying device, and a nonlinear positive dispersion fiber. The dispersion compensating device is designed to be operable on an optical signal having at least one wavelength channel lying in a wavelength range. A dispersion compensating device according to one embodiment of the invention is shown in schematic view in FIG. 1. Dispersion compensating device 150 includes a negative dispersion fiber 152, a discrete amplifier 154, and a nonlinear positive dispersion fiber 156 connected in series. The nonlinear positive dispersion fiber may have a total dispersion of at least about 50 ps/nm at a wavelength within the wavelength range. In certain desirable embodiments of the invention, the nonlinear positive dispersion fiber has a total dispersion of at least about 100 ps/nm at a wavelength within the wavelength range. In especially desirable embodiments of the invention, the nonlinear positive dispersion fiber has a total dispersion of at least about 200 ps/nm at a wavelength within the wavelength range. An input optical signal 160 including distorted pulses 162, 164 and 166 enters the device at the negative dispersion fiber. Each of the distorted pulses 162, 164 and 166 may be from a different single wavelength channel of a wavelength division multiplexed optical signal. Pulses coming from conventional optical communications systems may have a positive chirp or a negative chirp, depending on the wavelength dependence of the dispersion characteristics of the transmission fibers and dispersion compensating devices of the system. In the example of FIG. 1, pulse 162 has a larger positive chirp than does pulse 164, while pulse 166 has a negative chirp. In the drawings of the present application, positively chirped pulses are drawn as positive peaks (e.g. pulse 162), while negatively chirped pulses are drawn as negative peaks (e.g. pulse 166).

The pulses 162, 164 and 166 propagate through the negative dispersion fiber 152. In desirable embodiments of the invention, the input optical signal 160 is not intense enough to cause significant nonlinear effects in the negative dispersion fiber. The negative dispersion fiber 152 has a length and negative dispersion sufficient to remove any positive chirp from each of the wavelength channels of the input optical signal 160. For example, the negative dispersion fiber may have a dispersion more negative than −50 ps/nm/km over the wavelength range of the input optical signal 160. In desirable embodiments of the present invention, the negative dispersion fiber has a length sufficient to impose dispersion more negative than −150 ps/nm on the input optical signal. In especially desirable embodiments of the present invention, the negative dispersion fiber has a length sufficient to impose a dispersion more negative than −300 ps/nm on the input optical signal. Propagation of the input optical signal 160 through the negative dispersion fiber yields a negatively chirped optical signal 170. In the example of FIG. 1, the negatively chirped optical signal 170 includes negatively chirped pulses 172, 174 and 176. Pulse 172 has the smallest negative chirp, while pulse 176 has the largest negative chirp.

The negatively chirped optical signal 170 is coupled into discrete amplifier 154. The discrete amplifier 154 may be, for example, an erbium-doped fiber amplifier, or a discrete Raman amplifier, and desirably has a control mechanism operable to adjust the gain of the amplifier. In embodiments of the present invention having germania-doped silica based nonlinear positive dispersion fibers, the amplifier desirably increases the power carried by each wavelength channel to at least about 5 mW. In embodiments of the present invention desirable for use with 10 Gb/s signals and having germania-doped silica based nonlinear positive dispersion fibers, the amplifier increases the power carried by each wavelength channel to at least about 15 mW. In embodiments of the present invention desirable for use with 40 Gb/s signals and having germania-doped silica based nonlinear positive dispersion fibers, the amplifier increases the power carried by each wavelength channel to at least about 25 mW. In embodiments of the present invention having nonlinear positive dispersion fibers with higher nonlinearity than silica (e.g. chalcogenide photonic crystal or 'holey' fibers), the amplifier may provide significantly less amplification.

The amplified negatively chirped optical signal 180 (including amplified pulses 182, 184 and 186) is coupled into nonlinear positive dispersion fiber 156. The amplified negatively chirped optical signal has a power sufficient to cause significant nonlinear effects in the nonlinear positive dispersion fiber 156. In the nonlinear positive dispersion fiber 156, the interplay of pulse compression due to the positive linear dispersion of the fiber and pulse expansion due to self phase modulation (SPM) in the fiber acts to provide compressed pulses at the output of the fiber. For example, pulse 176 in FIG. 1 has a relatively large negative chirp. As the pulse propagates along the nonlinear positive dispersion fiber, the positive dispersion of the nonlinear positive dispersion fiber will serve to narrow pulse 176. As the pulse becomes more and more narrow, its power density increases, and pulse expansion due to self phase modulation becomes more and more important, gradually lessening the compression effect of the positive dispersion of the fiber. At some level of pulse compression, the expansion due to SPM essentially balances the compression due to dispersion, causing the pulse to propagate through the remainder of the nonlinear positive dispersion fiber without any further significant compression or expansion. The length of the nonlinear positive dispersion fiber is chosen to guarantee that pulses with the smallest positive chirp at the input of the device (and hence the largest negative chirp at the input of the nonlinear positive dispersion fiber) propagate a sufficient distance in the nonlinear positive dispersion fiber to achieve the state of self phase modulation/dispersion balance. Output signal 190 is depicted as having a positive chirp; as the skilled artisan will recognize, the output signal may be slightly positively chirped; slightly negatively chirped; or substantially unchirped, depending on the properties of the nonlinear positive dispersion fiber, and on the level of amplification of the signal.

The skilled artisan will also appreciate that the fiber-based dispersion compensating devices described herein are by design dynamic. That is, they are designed to compensate for variable amounts of chromatic dispersion in the input signal. The variable part of the compensation originates in the variable amount of SPM produced in the nonlinear positive dispersion fiber, and the dynamic range of the device (i.e., range of dispersion that can be compensated) is slightly larger than the total dispersion of the nonlinear fiber, as will be explained in a greater detail below.

In certain embodiments of the invention, it may be desirable to pre-amplify the signal for propagation in the negative dispersion fiber. For example, a discrete amplifier may be operatively positioned at the input of the device. Alternatively, Raman pumping may be used to provide Raman gain in the negative dispersion fiber. The amplification level is desirably set such that substantially no nonlinear effects are experienced by the signal in the negative dispersion fiber.

Another embodiment of the present invention is shown in schematic view in FIG. 2. In this embodiment of the invention, Raman pumping is used to provide gain in the nonlinear positive dispersion fiber. Dispersion compensating device 200 includes a negative dispersion fiber 202 and a nonlinear positive dispersion fiber 204 connected in series. The dispersion compensating device also includes an amplifying device configured to amplify the negatively chirped optical signal propagating in nonlinear positive dispersion fiber 204. According to this embodiment of the invention, the amplifying device is a Raman pump source 206 configured to cause Raman amplification of the optical signal in the nonlinear positive dispersion fiber 204. As shown in FIG. 2, the pump power from Raman pump source 206 may be configured to counter-propagate with the signal in the nonlinear positive dispersion fiber. The skilled artisan will appreciate that co-propagating pump configurations, or co- and counter-propagating pump configurations may also be used. In the device of FIG. 2, the Raman pump source is coupled to the nonlinear positive dispersion fiber using a WDM coupler 209, and an isolator 208 is operatively positioned between the nonlinear positive dispersion fiber and the negative dispersion fiber to block the propagation of Raman pump power between the fibers. This embodiment of the invention is especially useful when the nonlinear positive dispersion fiber has an especially high nonlinearity (e.g. chalcogenide glass fibers). In the embodiment shown in FIG. 2, the Raman pump power is coupled into the end of nonlinear positive dispersion fiber 204. In other embodiments of the invention using Raman pumping, it may be desirable to couple Raman pump power into the nonlinear positive dispersion fiber at two or more points along its length.

In the devices of the present invention, the nonlinear positive dispersion fiber will generally have a non-negligible propagation loss. As such, in using the device of FIG. 1, the gain of the discrete amplifier must be set high enough to ensure that pulses are sufficiently intense at the end of the nonlinear positive dispersion fiber to maintain the state of balance between self-phase modulation and dispersion throughout the fiber. The gain may be required to be high enough that other nonlinear effects (e.g. cross phase modulation and four wave mixing) distort the optical signal. Raman pumping can also be advantageously used in conjunction with a discrete amplifier to reduce the gain necessary from the discrete amplifier. An example of such a device is shown in FIG. 3. Device 220 includes a negative dispersion fiber 222, a discrete amplifier 224, and a nonlinear positive dispersion fiber 226, as described in connection with FIG. 1. The device also includes a Raman pump source 228 coupled to the nonlinear dispersion fiber via a WDM coupler 230. Raman pumping of the nonlinear positive dispersion fiber will provide additional amplification of the optical signal, allowing the necessary gain of discrete amplifier to be reduced. Desirably, the Raman pumping provides amplification approximately equivalent to the propagation loss of the nonlinear positive dispersion fiber at a wavelength within the wavelength range of the device. In especially suitable embodiments of the present invention, the amplification provided by the Raman pump source is within about 15% of the loss of the nonlinear positive dispersion fiber at a wavelength within the wavelength range of the device.

The usable transmission distance of binary encoded return-to-zero (RZ) 40 Gb/s signals can be limited by signal distortion caused by intra-channel nonlinear effects. Interaction of neighboring "1" pulses through so-called self cross-phase modulation (sXPM) and self four-wave mixing (sFWM) causes timing jitter and pulse amplitude fluctuations. Additional noise can also be produced by amplification of amplified spontaneous emission (ASE) through modulation instability (MI) effects. In the device of the present invention, in order to provide an increased dynamic dispersion compensation range, it is desirable to use relatively long lengths of nonlinear positive dispersion fiber having high dispersion. However, these fibers require relatively high powers for pulse compression; the high power and long lengths of the fiber may result in increased noise due to sFWM, sXPM and MI. Effectively, these effects limit the achievable range of dispersion compensation. These effects can be greatly reduced by using a nonlinear positive dispersion fiber having variable dispersion over its length.

According to one embodiment of the invention, the nonlinear positive dispersion fiber may have dispersion that is monotonically decreasing over its length, so as to reduce the effects of sFWM, sXPM and MI. This fiber is referred to as dispersion decreasing fiber (DDF). The use of dispersion decreasing fiber can counteract the effect of propagation loss in the nonlinear positive dispersion fiber. A dispersion decreasing fiber may have a smoothly decreasing dispersion, as described, for example, in "A Single Mode-Fiber with Chromatic Dispersion Varying Along the Length", Bogatyrev et al., J. Lightwave Tech., Vol. 9, No. 5, pp 561–566, 1991; U.S. Pat. No. 5,925,163; and U.S. Pat. No. 6,301,934, each of which is incorporated herein by reference in its entirety. Alternatively, as will be described in more detail below, a dispersion decreasing fiber may be formed from a plurality of segments of nonlinear positive dispersion fiber (e.g. each having a constant dispersion) coupled (e.g. spliced) end to end in order of decreasing dispersion.

Figure 4:
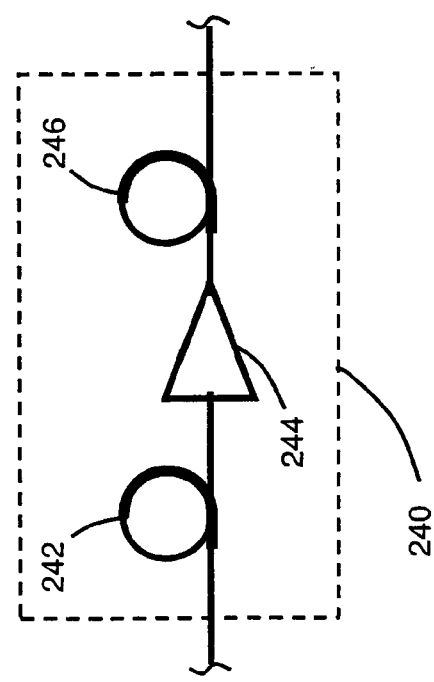
FIG. 4 is a schematic view of a dispersion compensating device including a dispersion decreasing fiber according to one embodiment of the present invention.

An example of such a device according to this embodiment of the invention is shown in schematic view in FIG. 4. Device 240 includes a negative dispersion fiber 242, a discrete amplifier 244, and a nonlinear positive dispersion decreasing fiber 246. Nonlinear positive dispersion decreasing fiber 246 is configured with its end of higher dispersion coupled to discrete amplifier 244. As a negatively chirped pulse travels along the nonlinear positive dispersion decreasing fiber 246, the pulse experiences loss, and therefore a gradual decrease in the degree of expansion due to SPM. The decrease in pulse expansion along the fiber due to optical loss is counteracted by the decrease in pulse compression due to the decreasing dispersion. The decrease in dispersion may essentially counteract the effect due to the loss. Dispersion decreasing fiber can also be used to provide additional compression of the soliton-like pulses, allowing the device to run at lower pulse powers, and therefore exhibit less noise due to other nonlinear effects.

As described herein, optical signals propagating in a nonlinear positive dispersion fiber must have high enough power to generate sufficient amount of SPM to compensate for this fiber's chromatic dispersion. It is well known in the art that the amount of optical power that can propagate in a certain length of optical fiber is limited by the onset of the so-called Stimulated Brillouin Scattering (SBS) effect, causing strong back-scattered signal to be generated and forward-propagating signal to be distorted. Therefore, the maximum amount of dispersion that can be nonlinearly compensated by the nonlinear positive dispersion fiber is limited by SBS, and it is generally beneficial for the operation of the dynamic compensation device described herein to use nonlinear positive dispersion fiber with a higher SBS threshold. The continuous variation of fiber core diameter often present in dispersion decreasing fibers results in a continuous change of the Brillouin frequency shift, increasing SBS threshold of this type of fiber. The SBS threshold may be further increased by applying a periodic temperature change along the fiber length, and/or using the nonlinear positive dispersion fiber with the refractive index profile specially designed to achieve reduced overlap between optical and acoustic modes. It is preferable that the refractive index profile of the nonlinear positive dispersion fiber is designed such that the reduced overlap between optical and acoustic modes results in SBS threshold higher than 10 mW for fiber length of 10 km. It is also preferable that the refractive index profile of the nonlinear positive dispersion fiber is designed such that the reduced overlap between optical and acoustic modes results in SBS threshold higher than one fundamental soliton power (mW) in one fundamental soliton length (km).

The skilled artisan will account for the loss of the dispersion decreasing fiber, the strength of the pulse expansion due to SPM in the dispersion decreasing fiber, and the target negatively chirped pulse power in order to properly design the dispersion properties of the dispersion decreasing fiber. Desirably, the dispersion of the nonlinear positive dispersion decreasing fibers used in the present invention is not too small because it could cause the formation of second or higher-order solitons. The power needed to form a second or higher-order soliton (assuming the sech pulse shape typical for optical solitons) is given by the equation $$P \approx \frac{0.776 N^2 \lambda^3 DA}{\pi^2 c n_2 \tau^2},$$

where N is the order of the soliton, D is the dispersion, $\lambda$ is the wavelength, A is the effective area of the propagating mode, c is the speed of light, $n_2$ is the nonlinear index of refraction of the fiber, and $\tau$ is the pulsewidth (G. P. Agrawal, "Nonlinear Fiber Optics", Academic Press, 2001). The skilled artisan will ensure that the terminal dispersion value of the dispersion decreasing fiber is large enough to discourage the formation of second or higher-order solitons at the power levels anticipated for use in the device. It is also desirable that the minimum dispersion of the dispersion decreasing fiber is large enough to avoid inter-channel crosstalk caused by four wave mixing and cross-phase modulation between different wavelength signal channels.

Figure 5:
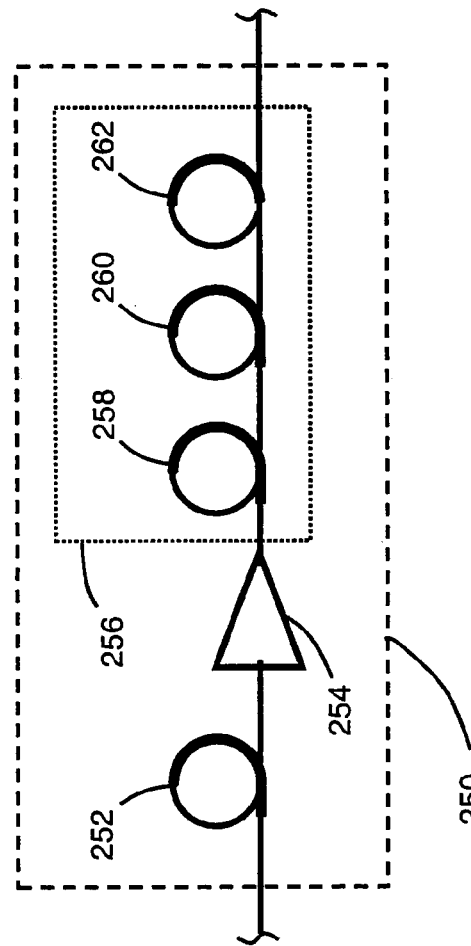
FIG. 5 is a schematic view of a dispersion compensating device including a dispersion decreasing fiber according to one embodiment of the present invention.

In another embodiment of the invention, shown in FIG. 5, the dispersion decreasing fiber is formed from a plurality of segments of nonlinear positive dispersion fiber (e.g. each having a constant dispersion) coupled end to end in order of decreasing dispersion. Such a fiber is known herein as a discrete dispersion decreasing fiber. Dispersion decreasing device 250 includes a negative dispersion fiber 252, an amplifying device 254, and a discrete dispersion decreasing fiber 256, which is constructed of three lengths of nonlinear positive dispersion fibers 258, 260 and 262. Nonlinear positive dispersion fiber 258 has the highest dispersion of the three, while nonlinear positive dispersion fiber 262 has the lowest dispersion. The dispersions and lengths of the individual fiber segments making up the discrete dispersion decreasing fiber are chosen by the skilled artisan to approximate a desired profile of decreasing dispersion. As the skilled artisan will recognize, the discrete dispersion decreasing fiber may be formed from any number of nonlinear positive dispersion fiber segments, each having an individually selected length and dispersion properties.

Figure 6:
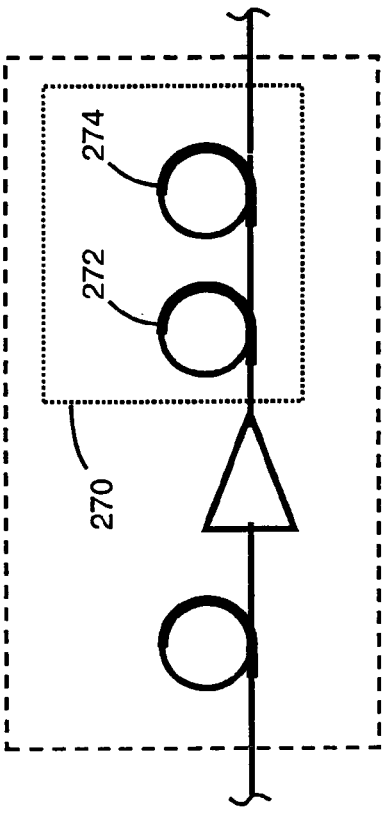
FIG. 6 is a schematic view of a dispersion compensating device including a dispersion decreasing fiber having a constant dispersion segment and a dispersion decreasing segment according to one embodiment of the present invention.

In another embodiment of the invention, shown in FIG. 6, the nonlinear positive dispersion fiber 270 can include both a constant dispersion fiber segment 272, and a decreasing dispersion fiber segment 274. Some pulse compression can occur in constant dispersion segment 272, with the rest of the pulse compression taking place in dispersion decreasing fiber segment 274. As described above, the dispersion decreasing fiber segment desirably has a high enough dispersion to discourage the formation of second and higher-order solitons. In an alternative embodiment of the invention, the dispersion decreasing fiber may be nearer the input of the device, with the constant dispersion fiber at the output.

In the devices of the present invention, the level of pulse compression in the nonlinear positive dispersion fiber depends on a number of factors (e.g. incoming pulse width; amplified pulse power; level of Raman pumping; and dispersion, loss and nonlinearity of nonlinear positive dispersion fiber). For a given nominal amplifier gain, however, the compression of pulses of different wavelengths may be very different due to the wavelength dependence of the amplifier gain, the fiber dispersion, and the effective area of the mode in the nonlinear positive dispersion fiber. In order to regulate and equalize the compression of various signals of a wavelength division multiplexed optical signal, it may be desirable to include a wavelength dependent variable optical attenuator operatively positioned between the discrete amplifier and the nonlinear positive dispersion fiber. In the device 280 of FIG. 7, wavelength-dependent attenuator 282 is operatively positioned between the discrete amplifier 284 and the nonlinear positive dispersion fiber 286. The wavelength-dependent attenuator can be any suitable device that provides differing levels of attenuation for different wavelength channels of the optical signal. The wavelength-dependent attenuator may be passive or actively controllable, and may be based on various technologies, such as fiber Bragg gratings and cascaded Mach-Zehnder interferometers. The wavelength-dependent attenuator may be, for example, a tilt VOA or a slope VOA, such as those described in U.S. patent application Ser. No. 09/929,498, which is incorporated herein by reference; or a dynamic gain flattening filter such as that described in U.S. patent application Ser. No. 09/902,424, and in U.S. Patent Application Publication 2002/0054726, which are incorporated herein by reference. The wavelength-dependent attenuator allows the skilled artisan to adjust the compression of individual wavelength channels relative to one another. While in this embodiment the wavelength-dependent attenuator is operatively positioned between the discrete amplifier and the nonlinear positive dispersion fiber, it may also be positioned between the negative dispersion fiber and the discrete amplifier in order to provide power compensation before amplification.

Figure 7:
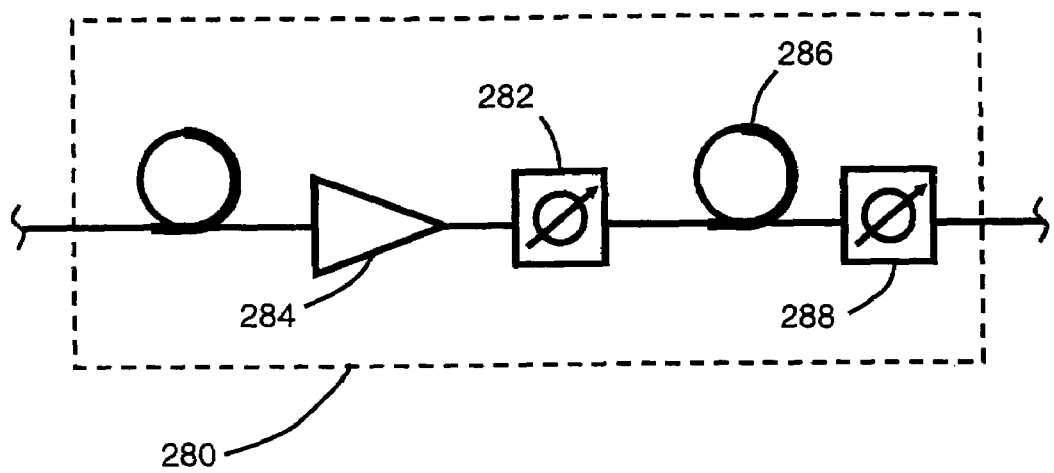
FIG. 7 is a schematic view of a dispersion compensating device including variable optical attenuators according to one embodiment of the present invention.

When using silica-based nonlinear positive dispersion fibers, it may be necessary for the pulses to be amplified to levels of over a few mW in order to achieve pulse compression. However, in some instances it may not be desirable to provide such high power pulses to an optical communications system. It therefore may be desirable for the devices of the present invention to include an attenuator operatively positioned at the output of the nonlinear positive dispersion fiber. In the device of FIG. 7, attenuator 288 is provided at the output of the device. The attenuator may be a variable optical attenuator (VOA), and may provide wavelength dependent attenuation, as described above.

As discussed above, propagation of high power signals (at least half of the power of the fundamental soliton) in nonlinear positive dispersion fiber causes unwanted distortion due to nonlinear effects such as sFWM, sXPM, as well as modulation instability and distributed Raleigh scattering. Therefore, even if dispersion-decreasing fiber is used, the maximum achievable compensation range is still limited because the length and the total dispersion of the dispersion-decreasing fiber can not be increased indefinitely. For better understanding of the present invention, it is useful to illustrate this fact by the results of numerical modeling.

A nonlinear dynamic dispersion compensating device, (for example, the device illustrated in FIG. 1) has two distinctly different regimes of operation. At one end of its dynamic range, the residual channel dispersion after pre-compensation (i.e. after the fixed length of standard dispersion compensating fiber (negative dispersion, negative slope) is roughly equal (and opposite in sign) to the total dispersion of the nonlinear positive dispersion fiber. In this case, the residual (negative) dispersion is compensated essentially in a linear way, by the positive dispersion of nonlinear positive dispersion fiber. At the opposite end of the dynamic range, the residual channel dispersion after pre-compensation is close to zero. In this case, the channel power has to be amplified to approximately the fundamental soliton level to cancel the dispersion of the nonlinear positive dispersion fiber by SPM. Therefore, maximum signal distortion by unwanted nonlinear propagation effects is expected at this end of the dynamic range and this is the case we choose for modeling. For simplicity, propagation of only one wavelength-division multiplexed (WDM) channel in the nonlinear positive dispersion fiber is considered and nonlinear positive dispersion fiber is assumed to have no attenuation.

Figure 8:
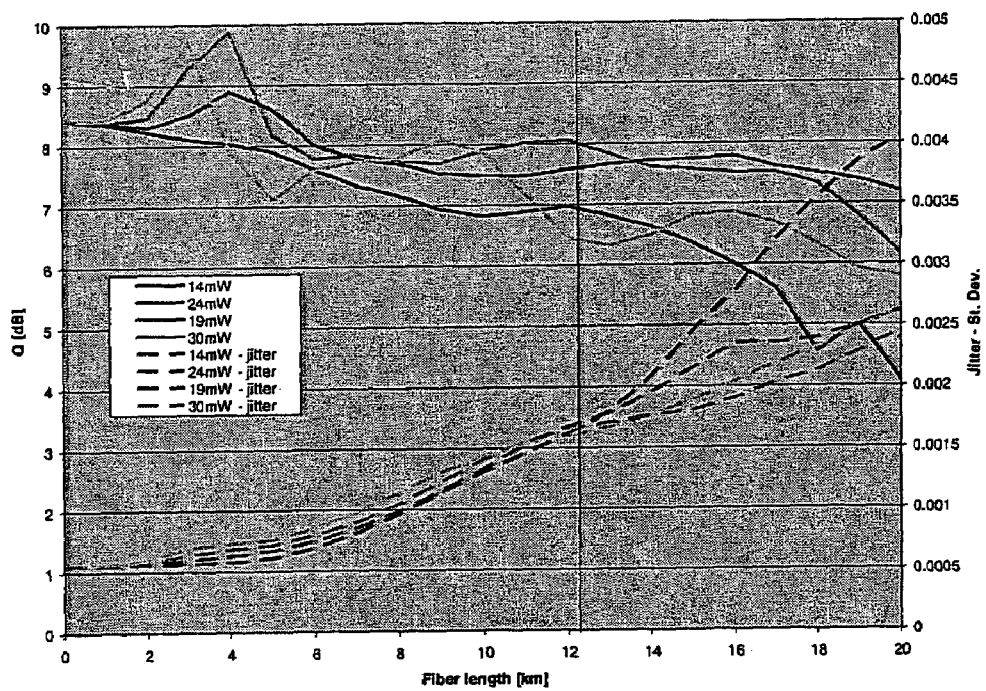
FIG. 8 depicts changes in Q-factor and timing jitter of the signal propagating along the length of a positive dispersion fiber.

FIG. 8 depicts the evolution of the signal Q-factor and the timing jitter along the length of nonlinear positive dispersion fiber for several different values of the launch power. The Q-factor is the measure of the signal-to-noise ratio that would be produced in the electrical domain when signal is detected, often given in dB units (10 log Q or 20 log Q). The timing jitter is the root mean square (RMS) statistical deviation of the optical pulse peak positions from the nominal center of the bit slot. Numerical results presented in FIG. 8 correspond to a dispersion compensating device having a single nonlinear positive dispersion fiber segment, such as shown, for example, on FIG. 1. The input signal has no residual dispersion after pre-compensation and a Q-factor of approximately 8.5 dB on the 10 log scale. The nonlinear positive dispersion fiber has a constant dispersion of 8 ps/nm/km and no attenuation (loss). It is evident from this figure that for all the values of the input power the quality of the signal (represented by the Q-factor) eventually degrades beyond an acceptable limit, as a result of either fiber dispersion or nonlinear effects. If we choose a Q-factor penalty (drop) of 1 dB (2 dB on a commonly used 20 log scale) as an acceptable limit, than the optimum launch power into the nonlinear positive dispersion fiber is 19 mW, and the maximum length of nonlinear positive dispersion fiber is 18 km. However, if we limit an acceptable timing jitter to 1.5 ps RMS (about 10% of the pulse width), then the optimum launch power is 24 mW and nonlinear positive dispersion fiber can not be longer than about 11 km. Therefore, it can be concluded that the maximum allowable total dispersion of nonlinear positive dispersion fiber in this case is limited to about 8×11=88 ps/nm, which can be translated into a dynamic range of only about 110 ps/nm (125%×88 ps/nm) for the dispersion compensating device. Similar results are produced for a nonlinear positive dispersion fiber with loss where local dispersion is monotonically decreasing at the same rate as the signal power (it can be shown that for ideal soliton propagation such fiber is equivalent to a lossless one with constant dispersion).

As mentioned above, many nonlinear effects produced by nonlinear positive dispersion fiber contribute to signal distortion. Four-wave mixing between a high power signal and broadband noise is often the largest signal distortion contributor. Four-wave mixing between high power signal and broadband noise causes parametric amplification of noise at wavelengths immediately adjacent to that of the signal. This noise amplification results in a random modulation of the signal pulses amplitude as well as jitter in the pulse arrival times. This phenomenon often referred to in technical literature as modulation instability, random generation of higher order solitons and Gordon-Haus effect. The farther the signal travels in the nonlinear positive dispersion fiber, the more amplitude fluctuations and timing jitter build up, which can also be observed as distortion in the spectrum of the signal. One solution to this problem is to insert spectral filters with a sufficiently narrow passband to allow only the signal components through while blocking parametrically amplified noise, thus limiting its accumulation. Therefore, it may be desirable for the devices of the present invention to include one or more spectral filters in order to reduce or eliminate unwanted spectral components associated with four wave mixing (sFWM) or other distortion effects.

Thus, the devices of the present invention may include a spectral filter operatively positioned to filter the signal. Spectral filtering of the signal can provide several advantages. For example, spectral filtering can help restore the pulsewidth of the compensated signal to that of the original chirp-free pulses, allowing the signal to travel farther in an optical network. The use of the optical filter may also provide partial noise compression and an increase of the dynamic range of the compensation device. In the presence of noise, particularly the ASE noise associated with optical amplifiers, the amplitude of the pulses at the input of the nonlinear positive dispersion fiber will vary. As a result, each pulse will experience a somewhat different amount of self phase modulation, and therefore a variable amount of compensation. If the spectral filter bandwidth is less than that of the self phase modulation-broadened spectral width of the signal, its application will result in all pulses being approximately transform limited, or having an equal temporal width (inversely proportional to the filter bandwidth). Thus, besides reshaping the optical signal, the optical filter can significantly reduce the fluctuation of both pulse amplitude and pulsewidth. This noise compression and pulse shape cleanup effect of spectral filtering is described in more detail in "Noise reduction of 20 Gbit/s pulse train using spectrally filtered solitons," Asobe et al., Electronics Letters 34(11), 1135, May 1998. It is often referred to in technical literature as 2R regeneration (the term "2R" stands for re-shaping and re-amplification).

The spectral filter may be operatively positioned at the output of the nonlinear positive dispersion fiber, as shown in FIG. 9. In alternative embodiments of the invention, the spectral filter may be operatively positioned between the amplifying device and the nonlinear positive dispersion fiber.

An embodiment of the present invention including a spectral filter is shown in schematic view in FIG. 9. Device 290 includes connected in series a negative dispersion fiber 292, an amplifying device 294, a nonlinear positive dispersion fiber 296, and a spectral filter 298. Generally, the spectral filter has a passband corresponding to each wavelength channel of an optical signal. For a multiple channel WDM signal, a periodic bandpass filter (i.e. a comb filter) is required. As the skilled artisan will recognize, the spectral filter can be constructed in many ways. For example, the spectral filter may be a Fabry-Perot filter, a Mach-Zehnder filter, a pair of arrayed waveguide grating filters connected back-to-back, or a pair of channel interleavers connected back-to-back. In using the device of FIG. 9, it may be desirable to compress the pulses to less than their original width (e.g. by between 80–100%) in the nonlinear positive dispersion fiber. The overcompression of the pulses can be achieved by increasing the effective gain of the amplifying device; using counter-propagating Raman pumping; or using a dispersion decreasing fiber segment in the nonlinear positive dispersion fiber. The optimum filter bandwidth $\Delta v$ depends on the modulation format. So-called "transform limited" or chirpless pulses have a spectral bandwidth inversely proportional to the temporal pulse width. The proportionality coefficient depends on pulse shape. For the hyperbolic secant shape (sech) typical of optical solitons, $\Delta v T_0 = 0.31$. Since for sech pulses $T_{FWHM} \sim 1.763\, T_0$, it follows that $$\Delta v \approx \frac{1.763 \cdot 0.31}{T_{FWHM}}.$$

(Similarly, for Gaussian pulses $$\Delta v \approx \frac{1.665 \cdot 0.44}{T_{FWHM}}\bigg).$$

For 8.3 ps long RZ sech pulses with a 33% duty cycle, the optimum filter bandwidth is $$\Delta v \approx \frac{1.763 \cdot 0.31}{8.3 \text{ ps}} \approx 66 \text{ GHz or } 0.53 \text{ nm at } 1550 \text{ nm}.$$

As the devices of the present invention rely on pulse compression that requires higher power and is associated with a certain degree of spectral broadening, simultaneous compensation/regeneration of all channels of certain dense WDM systems in a single nonlinear positive dispersion fiber may not be possible. For example, in a 40 Gbit/s RZ system with 100 GHz channel spacing, amplification of all channels to a level higher than the fundamental soliton power and propagation in a relatively long length of nonlinear fiber may result in a significant amount of interchannel crosstalk caused by cross phase modulation. To minimize crosstalk, it may be desirable to use an interleaver to split the channels of a dense WDM signal (e.g. 100 GHz) into two subsets, each having twice the channel spacing (e.g. 200 GHz). Each subset can be compensated using a separate nonlinear positive dispersion fiber. An exemplary device including an interleaver is shown in schematic view in FIG. 10. Device 300 includes negative dispersion fiber 302 and a first interleaver 304. Negative dispersion fiber 302 has a length and a dispersion sufficient to remove any positive chirp from each wavelength channel of the optical signal, thereby outputting a negatively chirped optical signal. Since the signal is relatively weak in negative dispersion fiber 302, all channels can propagate through it without suffering from undesired nonlinear effects. First interleaver 304 is configured to receive the negatively chirped optical signal and split the negatively chirped optical signal into a first subset including a first set of wavelength channels, and a second subset including a second set of wavelength channels. As the skilled artisan will recognize, the interleaver can also be operatively positioned before the negative dispersion fiber; in this case, a separate negative dispersion fiber is desired for each output of the interleaver. Each output of interleaver 304 is coupled to an amplifying device (306 and 308). First amplifying device 306 is coupled to first nonlinear positive dispersion fiber 310, while second amplifying device 308 is coupled to second nonlinear positive dispersion fiber 312. The outputs of first and second nonlinear positive dispersion fibers 310 and 312 are coupled to a second interleaver 314. Second interleaver 314 can provide a spectral filtering function; as such, a separate spectral filter is not necessary. In this embodiment of the invention, roughly half the total system power is in each nonlinear positive dispersion fiber. The reduced power and increased spectral separation of channels in each fiber reduces the chances of the signals suffering from undesired nonlinear effects. The skilled artisan will appreciate that in embodiment of the invention for use at the end of a transmission system, the second interleaver 314 may not be necessary. The outputs of the first and second nonlinear positive dispersion fibers 310 and 312 may each be coupled (optionally through a spectral filter) to a separate detector.

In another embodiment of the invention, a dispersion compensation device includes a negative dispersion fiber, and a plurality of compensation stages, each compensation stage including an amplifying device and a nonlinear positive dispersion fiber. In desirable embodiments of the invention, the compensation stages are coupled in series to the negative dispersion fiber. An example of a device according to this embodiment of the invention is shown in schematic view in FIG. 11. Device 320 includes a negative dispersion fiber 322, and two compensation stages 324 and 326. The skilled artisan will appreciate that the compensation stages need not be identical. For example, in device 320, compensation stage 324 includes erbium-doped fiber amplifier 328, and nonlinear positive dispersion fiber 330, while compensation stage 326 includes nonlinear positive dispersion fiber 332 and Raman pump source 334. As described above, spectral filtering may be used to provide noise rejection and signal regeneration. For example, device 320 includes a spectral filter 336 at the end of each compensation stage. The passbands of the spectral filters may be slightly offset in order to provide stronger noise compression.

For the following embodiment, we show (using numerical modeling) that using more than two segments of nonlinear positive dispersion fiber, with spectral bandpass filters situated in between, allows to significantly increase the dynamic range of the dispersion compensation.

Figure 12:
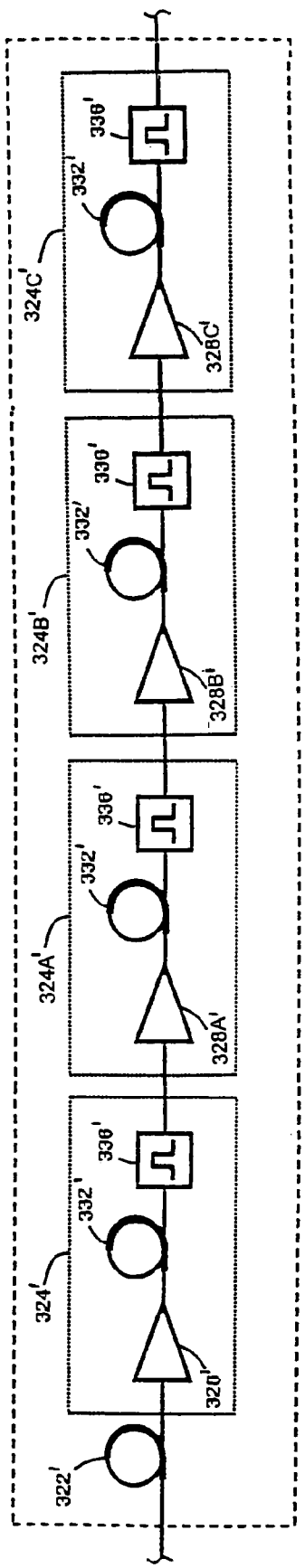
FIG. 12 illustrates a dispersion compensating device including four compensating stages according to one embodiment of the present invention.

FIG. 12 illustrates another embodiment of the present invention. In this embodiment the dispersion compensating device 320' includes a negative dispersion fiber 322' connected to four compensating stages 324', 324A', 324A', 324B', and 324C', arranged in series. The compensation stage 324' includes serially arranged: erbium doped fiber amplifier 328', nonlinear positive dispersion fiber 332' and a spectral filter 336'. Each of the compensation stages 324A', 324B' and 324C', includes an optical amplifier, nonlinear positive dispersion fiber segment 332' and a spectral filter 336'. The optical amplifier included in the compensation stages 324A', 324B', and 324C' may be a discrete optical amplifier (e.g. erbium doped amplifier 328'), or a Raman amplifier (not illustrated). For example, one or more of the nonlinear positive dispersion fiber segments 332' may be coupled to one or more Raman pumps to provide the requisite Raman gain and to function as Raman amplifiers.

Figure 13:
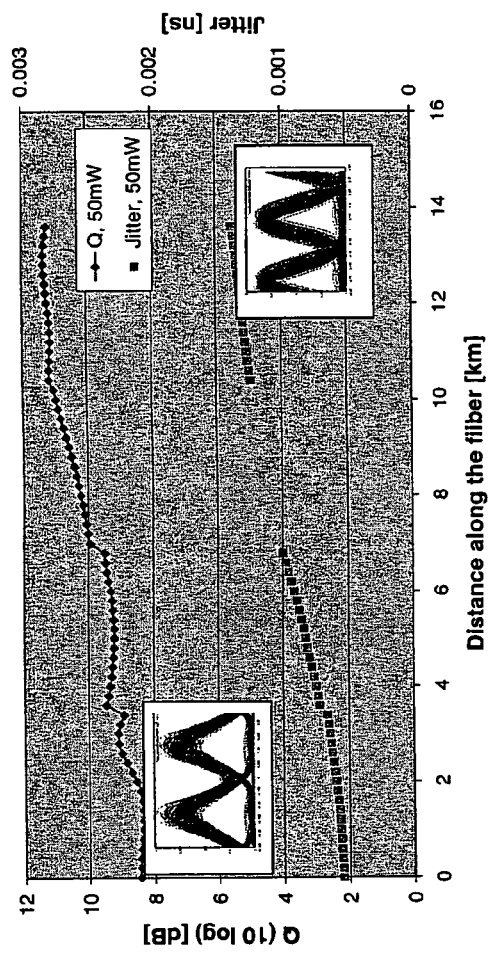
FIG. 13 illustrates evolution of Q-factor and timing jitter of the signal propagating along the four segments of the positive dispersion fiber in the four stage dispersion compensating device of FIG. 12.

FIG. 13 shows numerically calculated Q-factor and timing jitter evolution along the nonlinear positive dispersion fiber in a four-stage dispersion compensation device of the illustrative embodiment of FIG. 12. Each compensation stage 324', 324A', 324B', 324C' of this dispersion compensating device 320' includes an amplifier, a bandpass spectral filter 336' (represented in the model by a third-order Bessel function, 3 dB width 100 GHz) and a 3.5-km long piece of nonlinear positive dispersion fiber 332' with monotonically decreasing dispersion (DDF). All four DDFs are identical, with beginning value of dispersion equal to 12 ps/nm/km and the rate of dispersion decrease (exponential) chosen to be the same as the rate of signal power decrease due to fiber attenuation. As mentioned above, it can be shown that for the ideal soliton propagation, such DDF is equivalent to a lossless fiber because the soliton condition is fulfilled at any point along its length. The input signal used to generate the data of FIG. 13 is similar to that of the input signal used to generate the graph of FIG. 8. That is, the input signal has a Q-factor of 8.5 (10 log) dB and no residual dispersion. FIG. 13 inserts show eye diagrams of the signal at 0 and 14 km. There is a very significant difference in performance of the one stage device and the four stage device, as illustrated in FIG. 13 and FIG. 8. First, the signal Q-factor in the plot of FIG. 13 is ever increasing, and an improvement of approximately 2.5 dB (from 8.5 to 11 dB) is achieved at 14 km. This improvement is due to noise compression (2R regeneration) effect produced by the pulse compression due to the soliton effect and spectral filtering performed 4 times. Second, FIG. 13 also shows that the amount of timing jitter (<1.5 ps RMS) accumulated after 14 km is acceptable. The total dispersion of the nonlinear positive dispersion fiber (of the device used to produce the data presented in FIG. 13 is approximately 155 ps/nm, which translates into a dynamic range of about 194 ps/nm (125%×155 ps/nm) for the nonlinear dispersion compensation device.

Figure 14:
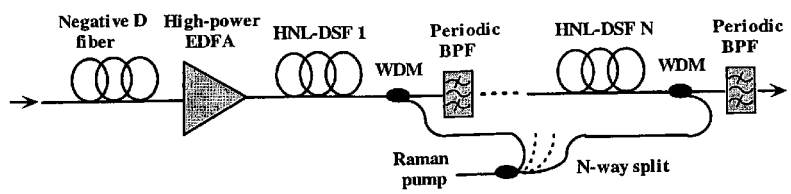
FIG. 14 illustrates a dispersion compensating device that includes a plurality of compensating stages comprising a section of a positive dispersion fiber coupled to and pumped by a Raman pump.

An important point is that even though the four-stage device of FIG. 12 utilizes four optical amplifiers, the last three amplifiers have to provide merely 1–2 dB of gain each, to compensate for the fiber attenuation and filter insertion loss. Therefore, one can utilize the design of FIG. 14, where discrete amplifiers (except the very first (booster) amplifier) are replaced by distributed Raman amplification by injecting Raman pump light in a backward direction at the end of each stage's nonlinear positive dispersion fiber. Since only a few dBs of amplification is required from each stage, a single high power Raman pump can be used to pump multiple stages, with the Raman pump output split N ways (N being the number of the stages). If Raman pumping is utilized, constant dispersion nonlinear positive dispersion fiber can be used instead of DDF, because fiber attenuation is canceled by Raman gain.

Utilizing a dispersion compensating device with four nonlinear compensation stages and spectral filters enabled us to roughly double the dynamic compensation range of the device (in respect to a single-stage embodiment) and at the same time achieve a very significant 2R regeneration effect. This device is relatively inexpensive because it utilizes only one Raman pump and does not use several discrete Er doped fiber amplifiers.

Another design option which is even more economical is to use a multiple-segment nonlinear positive dispersion fiber with dispersion continuously decreasing across all segments, at the same rate or somewhat faster than optical signal power. A single continuously drawn DDF cut into several pieces or separately drawn fibers can be used; in each case local dispersion at the beginning of the next segment of DDF should be equal to or less than that at the end of the previous one. The idea is that dispersion is closely following the optical power decrease across the whole device, due to nonlinear positive dispersion fiber attenuation and filters insertion loss, so that the soliton condition is fulfilled everywhere. The embodiment of the present invention according to this design is presented in FIG. 15. Obviously, the total length of all segments of nonlinear positive dispersion fiber and therefore total accumulated positive dispersion will be limited, because local dispersion monotonically decreasing along all segments can not be allowed to become negative. But, on the other hand, since optical power drop within the device is compensated by decreasing dispersion, no additional discrete or distributed amplification is needed. Therefore, the dispersion compensating device of this embodiment is essentially one-stage, with a single amplifier located between the negative dispersion fiber and the positive dispersion fiber of the device. Eliminating Raman pump(s) presents an additional cost advantage relative to the previous embodiment shown in FIG. 14.

Figure 16:
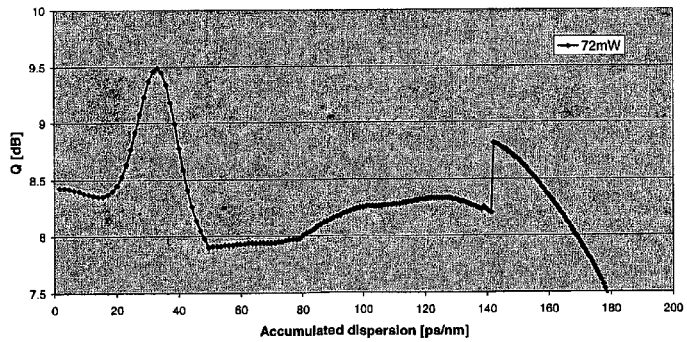
FIG. 16 illustrates Q-factor evolution of a signal propagating through a dispersion compensating device that includes three segments of monotonically decreasing dispersion fiber.
Figure 15:
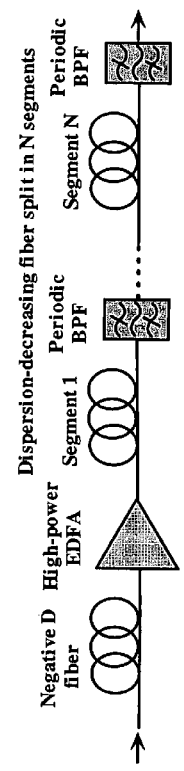
FIG. 15 illustrates another embodiment of the dispersion compensating device of the present invention.

The numerically calculated evolution in Q-factor as the signal propagates along the three DDF fiber segments of the embodiment of FIG. 15 is shown in FIG. 16, as a function of the total accumulated positive dispersion. As can be seen from FIG. 16, if the acceptable maximum drop in Q-factor is 1 dB, the maximum accumulated positive dispersion is approximately 175 ps/nm, translating into a dynamic compensation range of about 220 ps/nm (125%×175 ps/nm).

It is important to note that examples of FIG. 13 and FIG. 16 are intended to illustrate the significant benefit of periodic spectral filtering and do not necessarily represent the truly optimized device designs. The optimum length of the nonlinear positive dispersion fiber segments, local dispersion versus fiber length profiles, optimum channel launch power as well as optimum Raman pump power for each segment depend on the nonlinear positive dispersion fiber characteristics such as attenuation and effective area, as well as on the spectral shape and insertion loss of the filters, and can be determined by running numerical simulations similar to those described above, using any of the standard software packages developed for the optical transmission/communication systems modeling.

Figure 39:
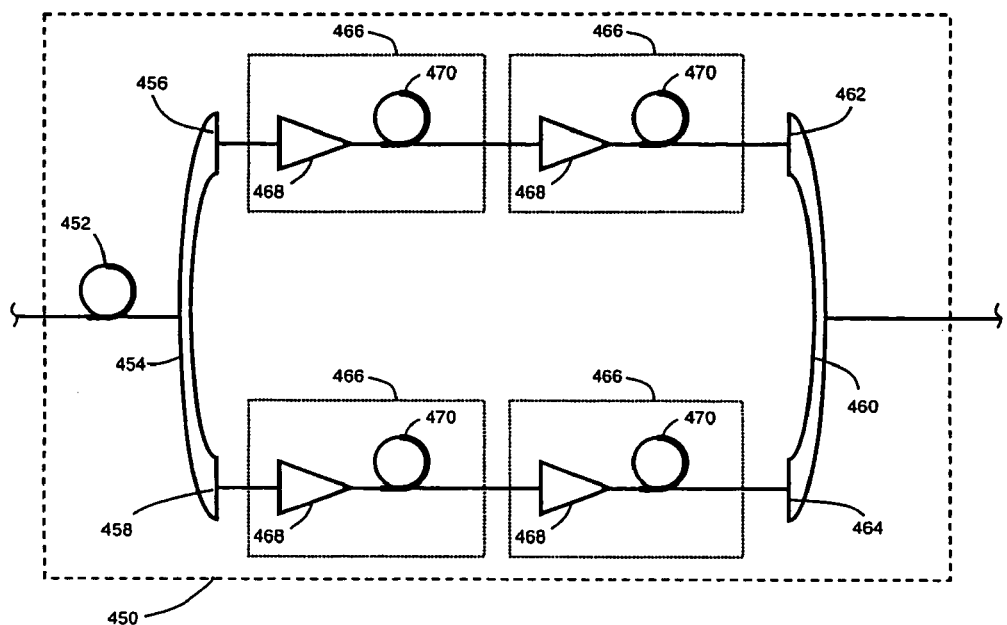
FIG. 39 is a schematic view of a device including interleavers multi-stage compensation.

The interleaver and multi-stage compensation embodiments can be used together in a single device; such an embodiment of the present invention is shown in FIG. 39. According to this embodiment of the invention, a dispersion compensating device 450 includes a negative dispersion fiber 452; a first interleaver 454 having outputs 456 and 458; and a second interleaver 460 having inputs 462 and 464. A plurality of compensation stages 466 are coupled in series between a first output 456 of first interleaver 454 and a first input 462 of second interleaver 460. Likewise, a plurality of compensation stages 466 are coupled in series between a second output 458 of first interleaver 454 and a second input 464 of second interleaver 460. Each compensation stage includes an amplifying device 468 and a nonlinear positive dispersion fiber 470.

The skilled artisan can use standard numerical methods to simulate the balance between self phase modulation and fiber dispersion for purposes of device design. For example, the total field method proposed by François in "Nonlinear propagation of ultrashort pulses in optical fibers: total field formulation in the frequency domain," J. Opt. Soc. Am B, Vol. 8, No. 2, pp 276–293, February 1991, which is incorporated herein by reference, may be used. A good approximation of the pulse power required to balance dispersion and self phase modulation in a nonlinear positive dispersion fiber is given by the equation $$P = \frac{\lambda^3 DA}{1.28\pi^2 c n_2 \tau^2}$$

in which P is the power of the pulse, $\lambda$ is the center wavelength of the pulse, D is the dispersion of the optical fiber (e.g. in ps/nm/km), c is the speed of light, $n_2$ is the nonlinear index of refraction of the material of the core of the nonlinear positive dispersion fiber (e.g.: silica has $n^2 \sim 3 \times 10^{-16}$ cm$^2$/W), and $\tau$ is the width of the pulse. Further information regarding soliton propagation may be found in *Fiber Optics Handbook*, Michael Bass ed., Chapter 7: "Solitons in Optical Fiber Communication Systems," P. V. Manyshev, McGraw-Hill, 2002.

Figure 32:
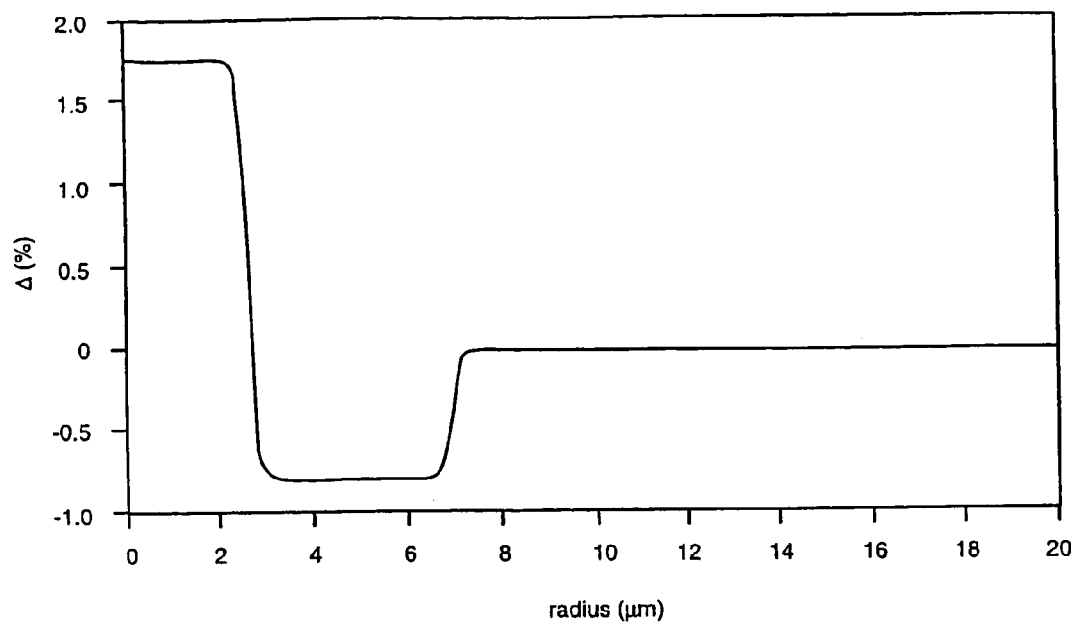
FIG. 32 is a diagram of a profile of a suitable nonlinear positive dispersion fiber for use in the present invention.
Figure 33:
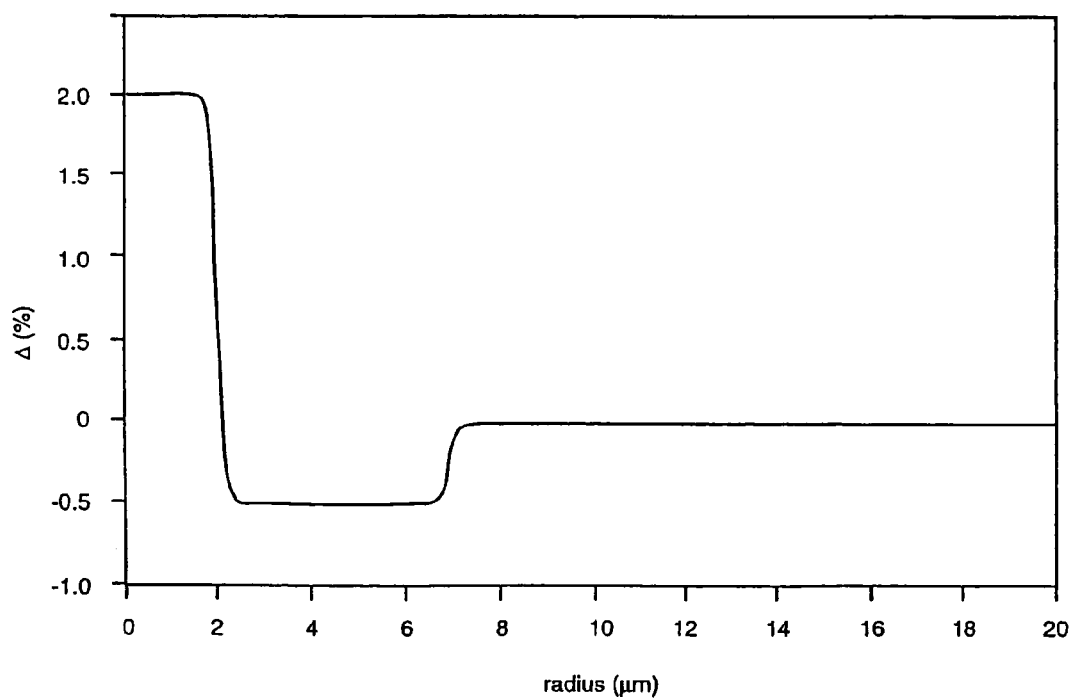
FIG. 33 is a diagram of a profile of another suitable nonlinear positive dispersion fiber for use in the present invention.

In order to minimize the power required to achieve the desired balance of self phase modulation and dispersion, it may be desirable for the nonlinear positive dispersion fiber to have an effective area less than about 35 µm$^2$, and a dispersion more positive than about 4 ps/nm/km. In especially desirable embodiments of the present invention, the nonlinear positive dispersion fiber has a dispersion more positive than 8 ps/nm/km. For use with optical communication systems operating at 10 Gb/s, it may be desirable for the nonlinear positive dispersion fiber to have a dispersion between about 15 ps/nm/km and about 30 ps/nm/km over the wavelength range of the optical signal. An example of a suitable nonlinear positive dispersion fiber for use in a 10 Gb/s device is shown in FIG. 32. At a wavelength of 1550 nm, the fiber of FIG. 32 is predicted to have a single mode cutoff wavelength of about 1545 nm, an effective area of about 18 µm$^2$, a dispersion of about 23 ps/nm/km, a dispersion slope of about 0.052 ps/nm$^2$/km, and an attenuation of about 0.25 dB/km. Suitable nonlinear positive dispersion fibers for use with optical communication systems operating at 40 Gb/s have dispersion values between about 4 and about 20 ps/nm/km over the wavelength range of the optical signal. An example of a suitable nonlinear positive dispersion fiber for use in a 40 Gb/s device is shown in FIG. 33. At a wavelength of 1550 nm, the fiber of FIG. 33 is predicted to have a single mode cutoff wavelength of about 1331 nm, an effective area of about 13 µm$^2$, a dispersion of about 10 ps/nm/km, a dispersion slope of about 0.033 ps/nm 2/km, and an attenuation of about 0.27 dB/km. The nonlinear positive dispersion fibers of FIGS. 4 and 5 can be fabricated by the skilled artisan, for example, using germanium and fluorine-doping of silica glass using standard OVD, MCVD, PCVD or VAD methods. Other nonlinear positive dispersion fibers may be used in the present invention. For example, the skilled artisan may use microstructured optical fibers (e.g. photonic crystal or 'holey' fibers), such as those formed from chalcogenide glass materials and described in U.S. patent application Ser. No. 10/146,199, which is incorporated herein by reference. It is noted that due to the high nonlinearity of the chalcogenide glass materials, much lower pulse powers would be necessary to balance dispersion and self-phase modulation in such fibers.

EXAMPLES

The present invention is further described by the following non-limiting examples.

Example 1

Figure 17:
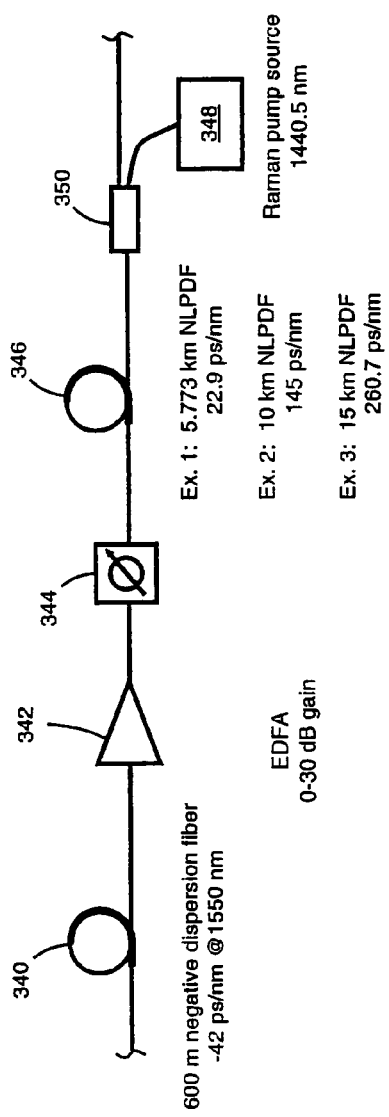
FIG. 17 is a schematic view of the dispersion compensating devices of Examples 1, 2 and 3.

A dispersion compensating device including a negative dispersion fiber, an amplifying device, and a nonlinear positive dispersion fiber was constructed as shown in FIG. 17. The negative dispersion fiber 340 was a dispersion compensating fiber with a dispersion of −88.9 ps/nm/km, giving a total dispersion of −42 ps/nm at a wavelength of 1550 nm and a length of 600 meters. The amplifying device 342 was an erbium doped fiber amplifier capable of providing up to 30 dB gain. A variable optical attenuator 344 was coupled to the output of erbium doped fiber amplifier to provide fine control of the amplified pulse power. Nonlinear positive dispersion fiber 346 was coupled to variable optical attenuator 324. Nonlinear positive dispersion fiber 346 was 5.773 km long and had the following properties:

| | |
|---|---|
| Loss at 1450 nm | 0.766 dB/km |
| Loss at 1550 nm | 0.448 dB/km |
| Mode field diameter at 1550 nm | 4.416 µm |
| Dispersion at 1550 nm | 3.961 ps/nm/km |
| Dispersion slope at 1550 nm | 0.0486 ps/nm$^2$/km |
| Single mode cutoff | 1129 nm |

Nonlinear positive dispersion fiber 346 had a total dispersion of 22.9 ps/nm at 1550 nm. Raman pump source 348 was coupled into nonlinear positive dispersion fiber 346 by WDM coupler 350. Raman pump source included two laser diodes operating at 1440.5 nm.

A 10 GHz pulsed input signal was generated by gain-switching a DFB laser diode. The 10 GHz signal was formed from a periodic pulse train with a frequency of 10 GHz. The pulses had a positive chirp, with a center wavelength of 1546.72 nm, a spectral bandwidth of about 0.32 nm, and a pulsewidth of about 21 ps. The chirp and dispersion of the pulses were C=2.4 and D=41 ps/nm, respectively. The chirp-free pulsewidth of this signal is similar to that of a 33% RZ 40 Gb/s signal.

Figure 19:
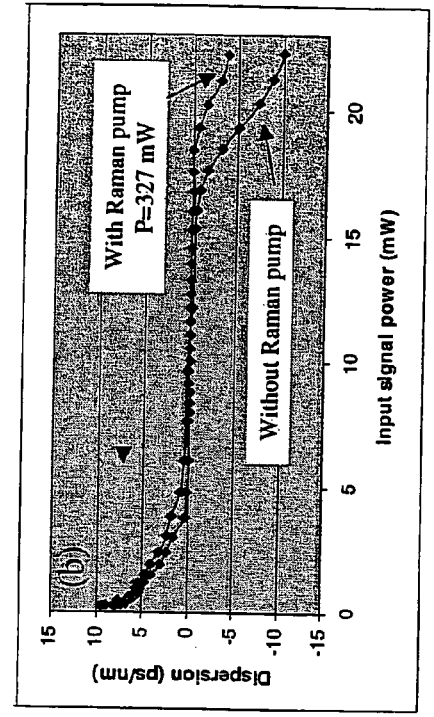
FIGS. 18 and 19 are plots of pulsewidth and dispersion, respectively, vs. amplified signal power for the experiment of Example 1.
Figure 18:
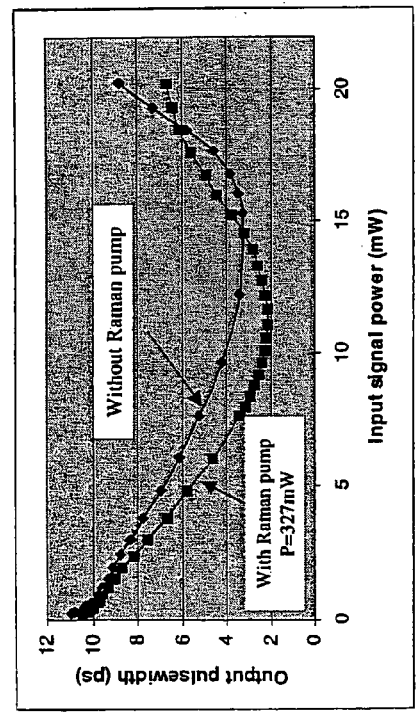
Figure 20:
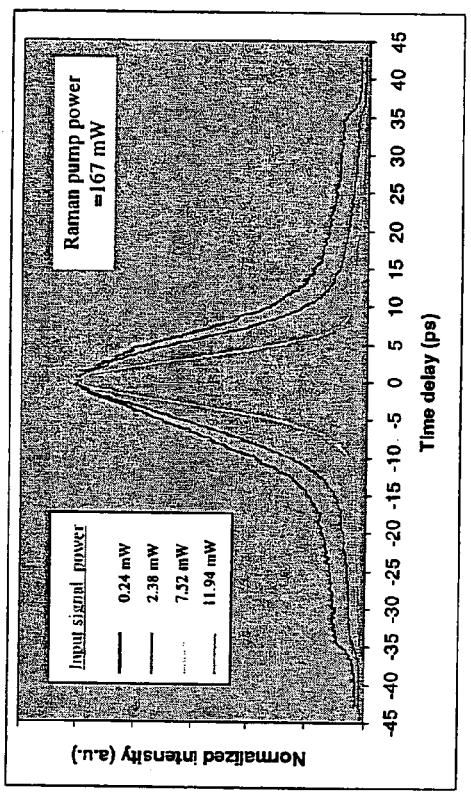
FIG. 20 is a set of autocorrelation traces for the experiment of Example 1.

The signal was introduced to the device. The Raman pump source provided varying amounts of pump power at 1440.5 nm. Amplifying device 322 and variable optical attenuator 324 were used to adjust the power of the signal entering nonlinear positive dispersion fiber 326. FIGS. 18 and 19 show pulsewidth and dispersion of the output of the device at various amplification levels both with and without Raman pumping. Raman pumping at a pump power of 327 mW decreased the amplifier power necessary to yield a given amount of dispersion compensation. FIG. 20 shows autocorrelation traces of the output signal with Raman pumping at 167 nm for various amplification levels. In this device, this level of Raman pumping effectively cancels the loss of the nonlinear positive dispersion fiber. The pulses have essentially no pedestal shape.

Example 2

The nonlinear positive dispersion fiber 346 of the device of Example 1 was replaced with 10 km of a nonlinear positive dispersion fiber having the following properties:

| | |
|---|---|
| Loss at 1450 nm | 2.17 dB/km |
| Loss at 1550 nm | 0.69 dB/km |
| Mode field diameter at 1550 nm | 4.478 μm |
| Dispersion at 1550 nm | 14.5 ps/nm/km |
| Dispersion slope at 1550 nm | 0.0547 ps/nm$^2$/km |
| Single mode cutoff | 1486.82 nm |

The nonlinear positive dispersion fiber had a total dispersion of 145 ps/nm at 1550 nm. The same signal as in Example 1 was used. The Raman pump power was 327 mW.

Figure 22:
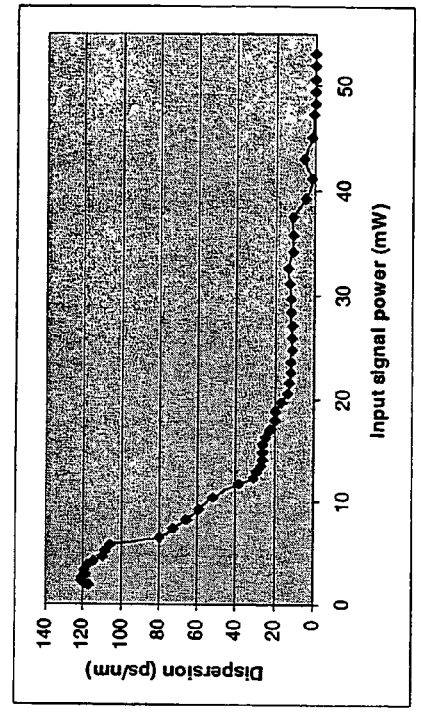
FIGS. 21 and 22 are plots of pulsewidth and dispersion, respectively, vs. amplified signal power for the experiment of Example 2.
Figure 21:
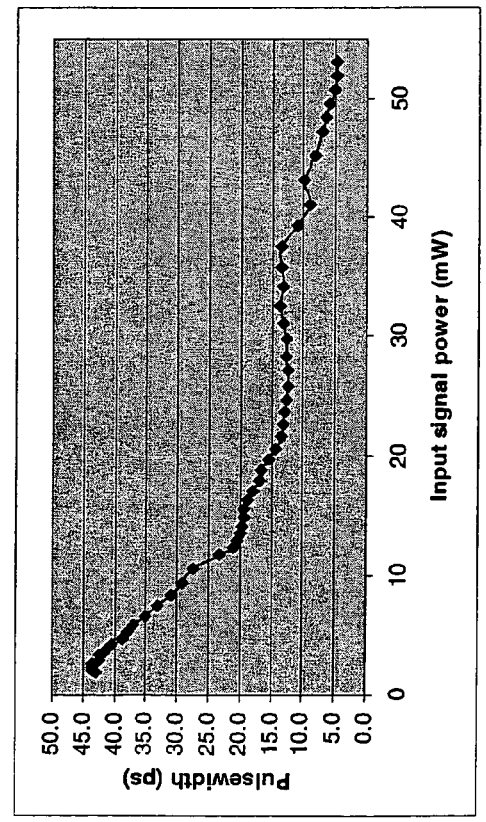

FIGS. 21 and 22 show pulse width and dispersion for various levels of amplification. About 38 ps, or about 120 ps/nm dispersion of the pulses is compensated by the device. The threshold power for achieving nearly total compensation was about 40 mW; this power could be reduced by using a nonlinear positive dispersion fiber having a lower loss. FIG. 23 shows the spectral and waveform details of the pulses at signal powers of 5.9 mW, 18.7 mW, and 47.2 mW. Only a slight expansion of the spectral bandwidth is observed at higher powers.

Example 3

In order to further increase the dynamic compensation range, the nonlinear positive dispersion fiber 346 of the device of Example 2 was replaced with 15 km of a nonlinear positive dispersion fiber having the following properties:

| | |
|---|---|
| Loss at 1450 nm | 0.809 dB/km |
| Loss at 1550 nm | 0.449 dB/km |
| Mode field diameter at 1550 nm | 5.0939 μm |
| Dispersion at 1550 nm | 17.38 ps/nm/km |
| Dispersion slope at 1550 nm | 0.0526 ps/nm$^2$/km |
| Single mode cutoff | 1416.42 nm |

The nonlinear positive dispersion fiber had a total dispersion of 260.7 ps/nm at 1550 nm. The same 10 Gb/s signal as in Example 2 was used. The Raman pump power was 300 mW.

FIGS. 24 and 25 show pulse width and dispersion as a function of pulse power. At low powers, the high dispersion of the nonlinear positive dispersion fiber imposed a large positive dispersion (~250 ps/nm) on the signal. At a pulse power of about 48 mW, nearly complete compensation of dispersion was achieved. Pulsewidth and dispersion remained essentially constant at pulse powers ranging from 48 mW to 120 mW; however, at pulse powers above 95 mW, the output pulses become noisy and unstable due to modulation instability. As the skilled artisan will appreciate, the device of the present Example exhibits a dynamic compensation range of ~250 ps/nm.

Example 4

Figure 26:
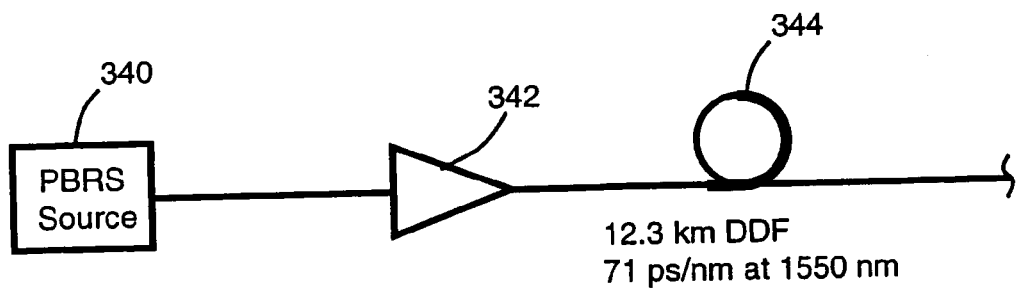
FIG. 26 is a schematic view of the device of Example 4.

An experimental device to test the use of dispersion decreasing fibers in the compensation of PBRS signals is shown in FIG. 26. The PBRS source 360 was based on the Anritsu 4-channel pattern generator and a 4×10 Gb/s electronic multiplexer. An SHF broadband RF amplifier and a Sumitomo lithium niobate Mach-Zehnder modulator are used to produce an NRZ optical signal. An additional dual-drive 20 Gb/s Mach-Zehnder modulator is used to carve pulses, converting the optical signal to RZ format. An SHF frequency doubler followed by a 3 dB splitter and two narrowband 20 GHz RF amplifiers are used to produce the clock signal driving the second Mach-Zehnder. PBRS source 360 was coupled to erbium-doped fiber amplifier 362, which in turn was coupled to dispersion decreasing fiber 364. Dispersion decreasing fiber 364 had a length of 12.3 km, and its dispersion decreased linearly from 10 ps/nm/km to 1.55 ps/nm/km at 1550 nm. The fiber had an effective area of about 25 μm$^2$. It had a loss of 0.22 dB/km at 1550 nm, and a total dispersion of 71 ps/nm at 1550 nm.

Figure 27:
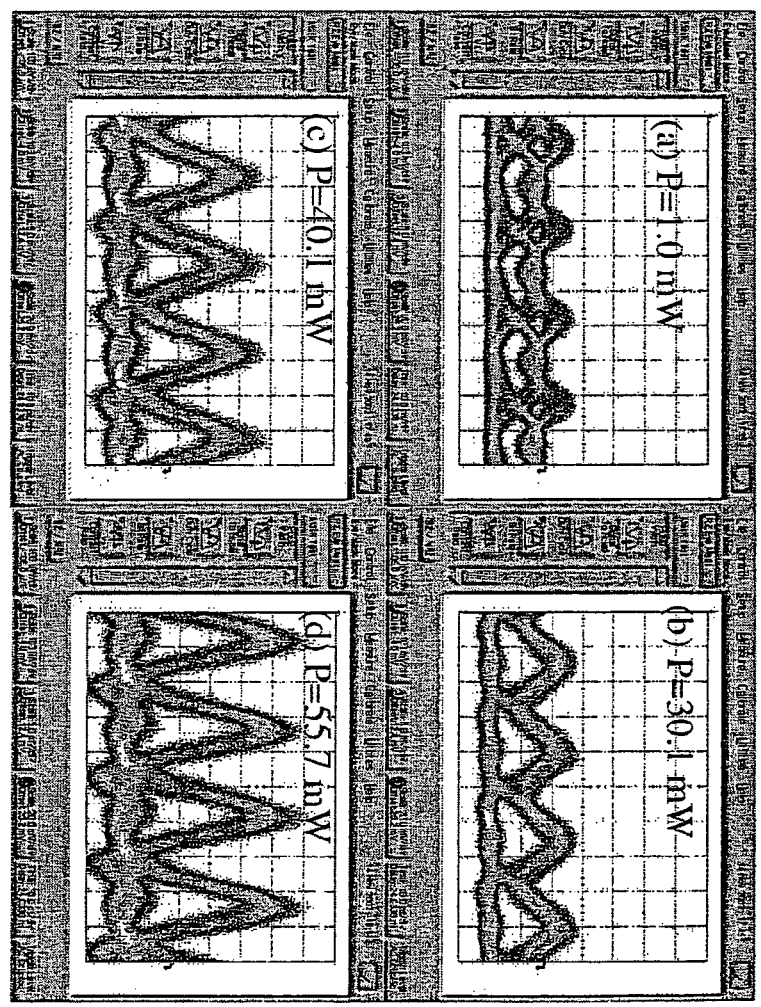
FIG. 27 is a set of eye diagrams at different amplified signal powers for the experiment of Example 4.

A two-channel conventional RZ 40 Gb/s PRBS signal with a 2$^7$-1 psuedorandom bit sequence was introduced to the experimental device. The two channels were separated by 200 GHz, with center wavelengths of 1550.9 nm (channel one) and 1552.5 nm (channel two). The spectral bandwidth and duration of the pulses for both channels were ~0.34 nm and ~7.5 ps, respectively, indicating that the signals were nearly transform-limited. The duty cycle of the signals was about 30%. The signals were essentially chirp-free. FIG. 27 shows eye diagrams for the output of channel one for several different pulse powers. At low input power (e.g. 1 mW), there is very little self phase modulation in the nonlinear positive dispersion fiber, so the eye is closed due to the positive dispersion of the nonlinear positive dispersion fiber. At higher input powers, self-phase modulation becomes more important. For example, at about 40 mW (per channel), the dispersion of the nonlinear positive dispersion fiber is essentially compensated by self phase modulation, yielding open eyes in the eye diagram. Similar results were observed for channel two. Since the input signals are essentially chirp-free, this Example exhibits an equivalent dynamic dispersion compensation range of ~71 ps/nm for RZ signals with an average pulse power of ~40 mW.

Example 5

Figure 28:
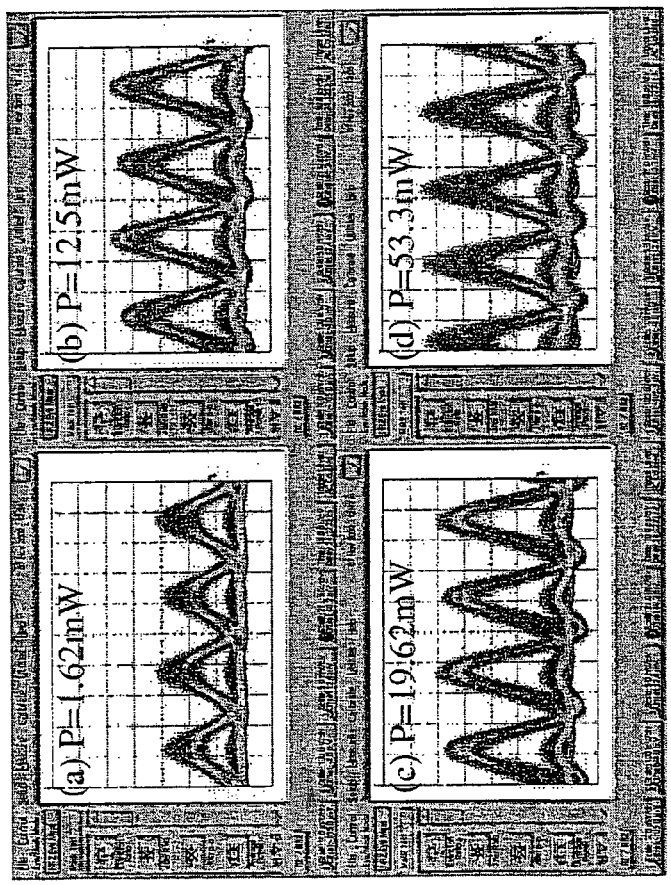
FIG. 28 is a set of eye diagrams at different amplified signal powers for the experiment of Example 5.

A 40 Gb/s CS-RZ signal was generated using the PBRS source of Example 4 by properly setting the DC bias of the second modulator. The channel spacing and channel wavelengths were the same as in Example 4, but the spectral bandwidth and pulsewidth for both channels were ~0.18 nm and ~15 ps, respectively. The signals were essentially chirp-free, and had a duty cycle of ~60%. These signals were propagated through the experimental device of FIG. 26. FIG. 28 shows eye diagrams for the output of channel one for several different pulse powers. As in Example 4, at low pulse powers the eyes were closed due to the positive dispersion of the nonlinear positive dispersion fiber. At between about 19 mW and about 50 mW, stable, chirp-free output was observed. At higher pulse powers (e.g. 53.3 mW), modulation instability caused an increase in noise. Similar results were observed for channel two. Since the input signals are essentially chirp-free, this Example exhibits an equivalent dynamic dispersion compensation range of ~71 ps/nm for CS-RZ signals with an average pulse power of ~19 mW.

Example 6

Figure 29:
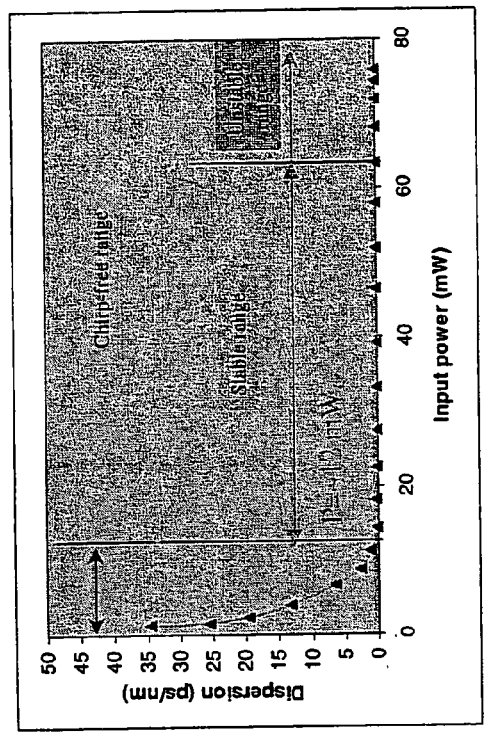
FIG. 29 is a plot of dispersion vs. amplified signal power for the experiment of Example 6.

A 250 m length of negative dispersion fiber having a total dispersion of about −25 ps/nm was introduced to the input end of the device of Examples 4 and 5. The 40 Gb/s RZ signal of Example 4 was introduced to the device; a graph of dispersion vs. pulse power is shown in FIG. 29. At powers between about 12 mW and about 65 mW, the output signal was stable and essentially chirp-free. At powers above about 65 mW, deleterious nonlinear effects caused the output signal to be noisy and unstable. The device of this Example exhibits a dynamic dispersion compensation range of about 46 ps/nm with a pulse power of ~12 mW.

Example 7

Figure 30:
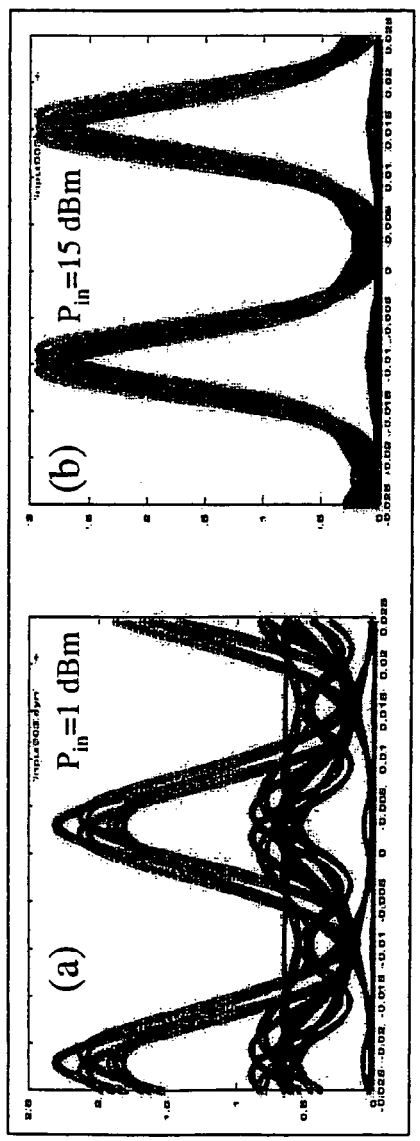
FIGS. 30 and 31 are simulated eye diagrams for the simulation of Example 7.
Figure 31:
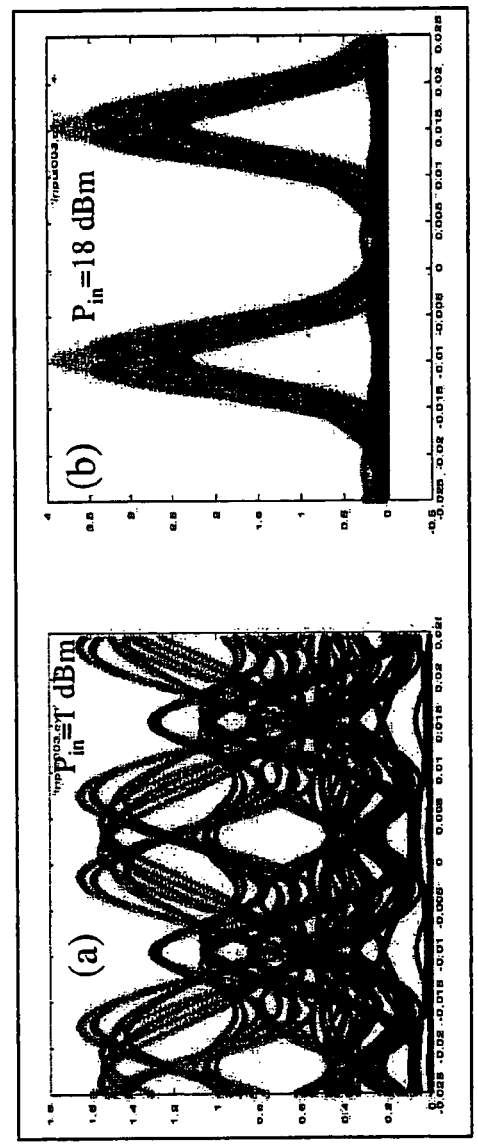

A numerical simulation was performed to model the use of discrete dispersion decreasing fiber as nonlinear positive dispersion fiber in the devices and methods of the present invention. FIG. 30 shows simulated eye diagrams for propagation of RZ 33% PRBS signals of 1.26 mW and 31.6 mW through a discrete dispersion decreasing fiber made up of three 3.33 km segments of nonlinear positive dispersion fiber having a uniform loss of 0.45 dB/km and dispersion values of (in order) 12, 9, and 6 ps/nm/km. FIG. 31 shows simulated eye diagrams for propagation of signals of 1.26 mW and 63.1 mW through a 10 km length of nonlinear positive dispersion fiber having a uniform loss of 0.45 dB/km and a dispersion of 12 ps/nm/km. The simulation of FIG. 30 results in a more open eye than does the simulation of FIG. 31. This may be explained by the fact that in the discrete dispersion decreasing fiber, the signal power can be maintained more closely to the fundamental soliton power while propagating along the fiber. In other words, the loss of self phase modulation along the fiber is balanced by the decrease in dispersion along the fiber. When a constant dispersion fiber is used, as in FIG. 31, higher power is needed to balance the dispersion with SPM along the whole fiber length, and consequently more signal distortion due to intra-channel effects such as sXPM, sFWM and MI takes place.

Example 8

Figure 34:
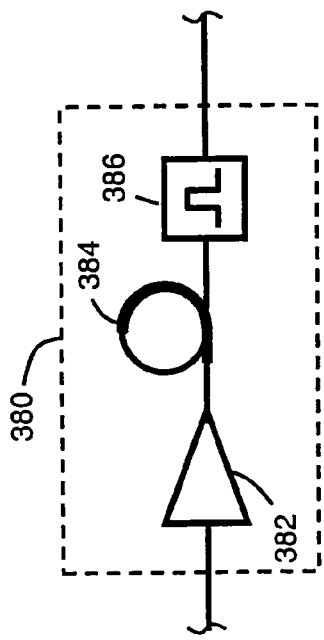
FIG. 34 is a schematic view of the device of Example 8.

FIG. 34 is a schematic diagram of a device including a dispersion decreasing fiber and a spectral filter. Device 380 includes a discrete erbium-doped fiber amplifier 382, and dispersion decreasing fiber 384, which had a length of 12.3 km, and a dispersion that decreased linearly from 10 ps/nm/km to 1.55 ps/nm/km at 1550 nm. The fiber had an effective area of about 25 µm². It had a loss of 0.22 dB/km at 1550 nm, and a total dispersion of 71 ps/nm at 1550 nm. For one of the experiments, as shown in FIG. 34, at the output of device 380 was a 100 GHz-200 GHz optical interleaver 386, performing the function of a periodic optical filter. The 3 dB bandwidth of each passband of the filter was ~0.64 nm.

Figure 35:
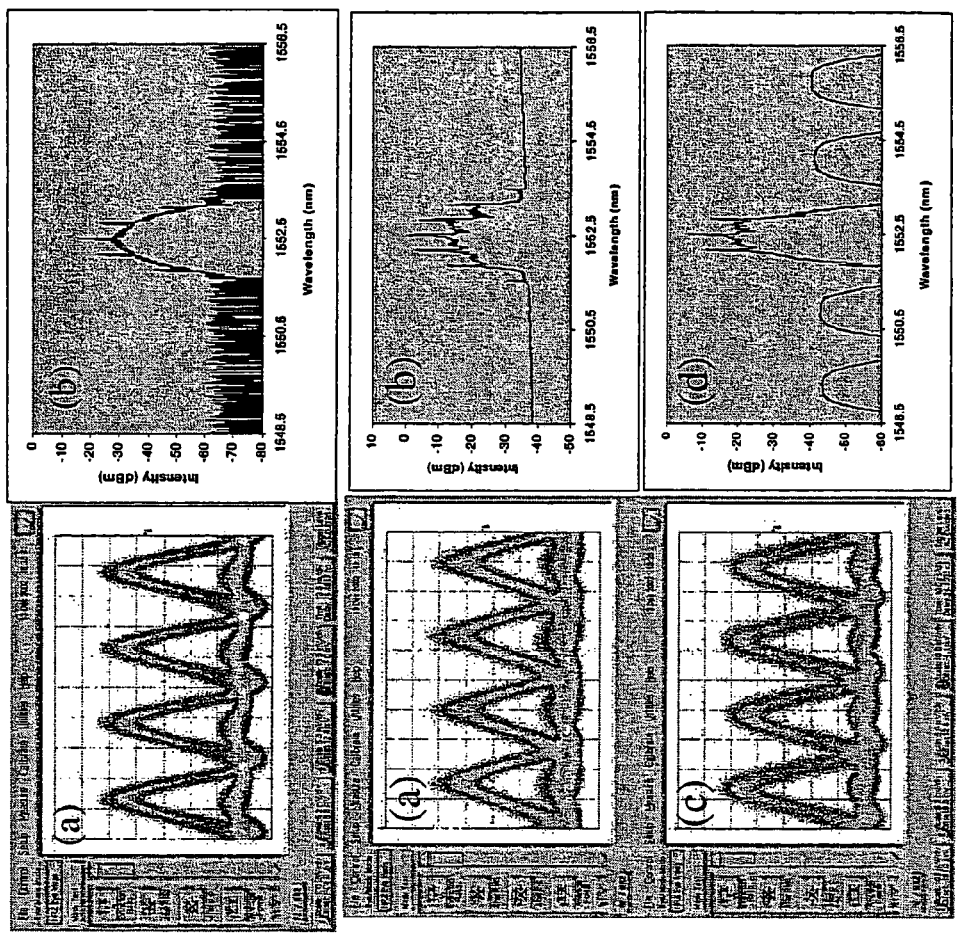
FIG. 35 is a set of eye diagrams and optical spectra for the input signal, the output signal without interleaver for the experiment of Example 8.

A conventional RZ 40 Gb/s PRBS signal with a $2^7-1$ psuedorandom bit sequence was introduced to device 380. The signal had a center wavelength of 1550.9 nm. The spectral bandwidth and duration of the pulses were ~0.34 nm and ~7.5 ps, respectively, indicating that the signal was nearly transform-limited. The duty cycle of the signal was about 35%. The signal was essentially chirp-free. FIG. 35 is a set of eye diagrams and optical spectra for the input signal, the output signal without interleaver 386, and the output signal with interleaver 386. FIG. 35 shows that the broadened spectrum exiting dispersion decreasing fiber 384 is trimmed by interleaver 386, reducing the spectral width from ~0.55 nm to ~0.35 nm, which is comparable to that of the input signal. The eye diagram of the signal after being filtered by the interleaver is more open in both the vertical dimension (amplitude noise), and the horizontal dimension (pulsewidth), indicating that the amplitude noise was reduced.

Example 9

Figure 36:
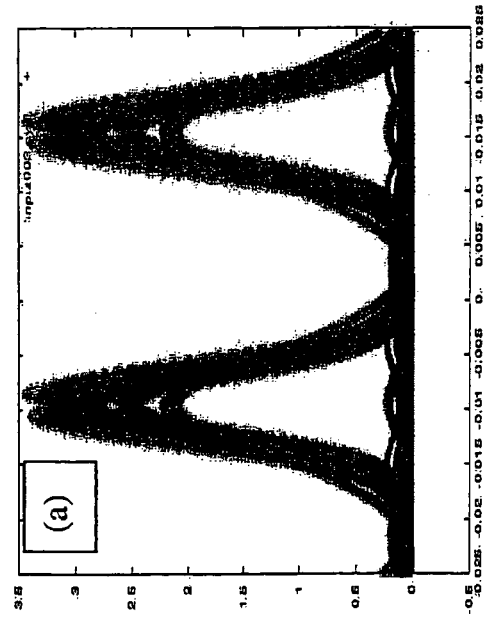
FIGS. 36 and 37 are simulated eye diagrams from the simulation of Example 9.
Figure 37:
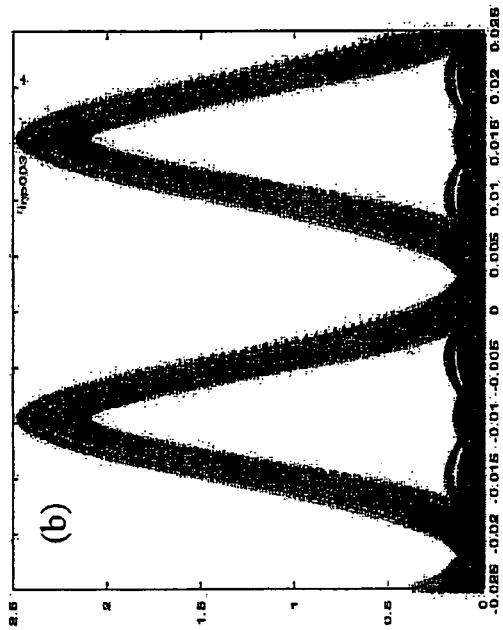

FIGS. 36 and 37 are simulated eye diagrams demonstrating the effect of spectral filtering on intrachannel crosstalk. The total compensation range of the dispersion compensating devices of the present invention is dependent on the total positive dispersion of the nonlinear positive dispersion fiber. However, as the dispersion of the nonlinear positive dispersion fiber increases, so does the pulse power necessary to achieve soliton-like propagation. At data rates approaching 40 Gb/s, signals of such high power can suffer from strong distortion caused by the nonlinear interaction of neighboring logical "1" pulses. FIG. 36 shows a numerically simulated eye diagram for propagation of an essentially noiseless CS-RZ 40 Gb/s signal amplified to an average power of 25.1 mW in a 10 km long fiber having a dispersion of 12 ps/nm/km. Nonlinear pulse-to-pulse interaction through sXPM and sFWM results in significant eye closure. FIG. 37 shows an eye diagram of the same signal after propagation through the same fiber and a 80 GHz wide 3rd order Butterworth spectral filter. It is evident that most of the signal distortion is removed. From this experiment, the skilled artisan will recognize that the use of a spectral filter can allow a device to have an increased dispersion compensation range for a 40 Gb/s signal otherwise limited by crosstalk.

Example 10

Figure 38:
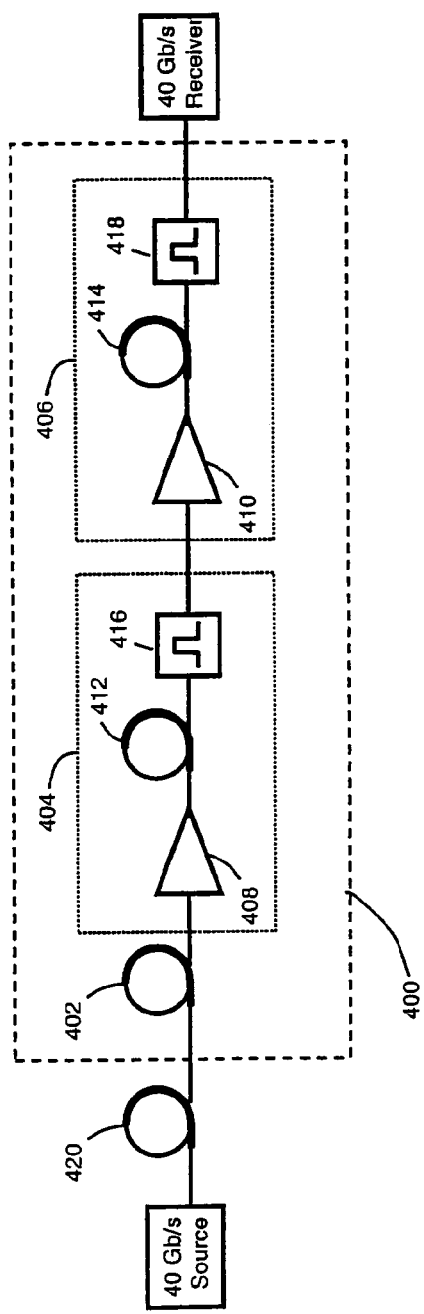
FIG. 38 is a schematic view of the device of Example 10.
Figure 40:
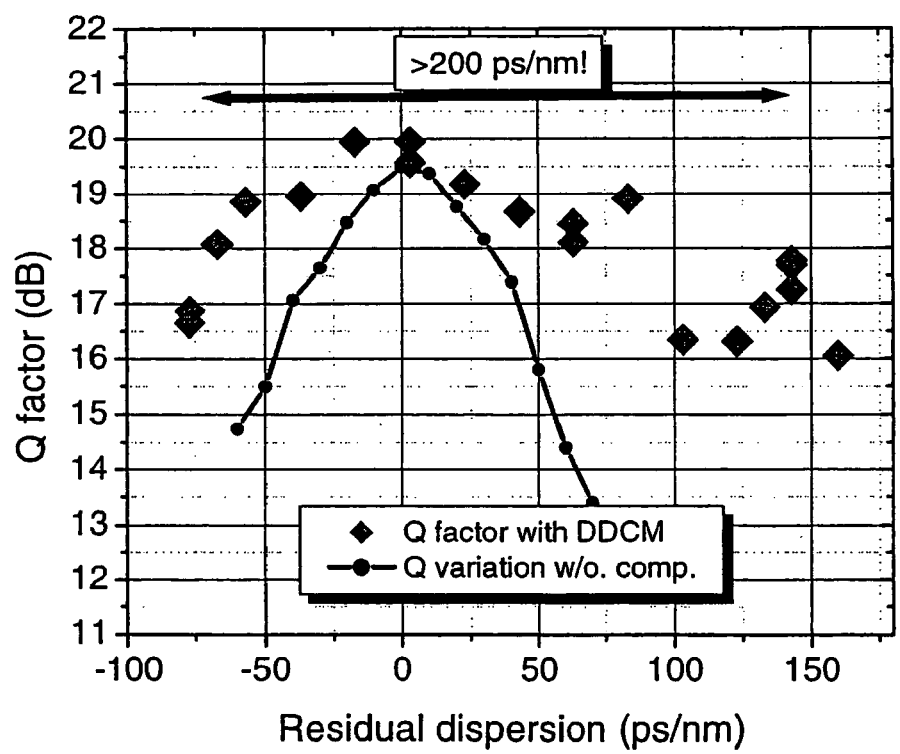
FIG. 40 is a plot of O factor vs. residual dispersion for the experiment of Example 10.

A dispersion compensating device having two compensation stages is shown in schematic view in FIG. 38. Device 400 includes negative dispersion fiber 402, and two compensation stages 404 and 406. Negative dispersion fiber 402 has a length of about 1.4 km and a total dispersion of about −140 ps/nm. Compensation stages 404 and 406 each include an erbium-doped fiber amplifier with output power control (408 and 410), and a length of nonlinear positive dispersion fiber (412 and 414). Nonlinear positive dispersion fiber 412 of stage 404 had a length of 6.43 km, a dispersion of 11.87 ps/nm/km at 1550 nm, a loss of 0.544 dB/km at 1550 nm, and an effective area of 15 $\mu m^2$ at 1550 nm. Nonlinear positive dispersion fiber 414 of stage 406 had a length of 5.84 km, a dispersion of 11.68 ps/nm/km at 1550 nm, a loss of 0.548 dB/km at 1550 nm, and an effective area of 15 $\mu m^2$ at 1550 nm. Each stage also included a tunable filter (416 and 418) having a passband 0.6 nm in width. An input signal was generated by passing a 40 Gb/s CS-RZ signal (67% duty cycle) through a length of fiber 420. Fiber 420 was varied from experiment to experiment to provide a range of dispersions on the signal input to device 400. The output of the device was coupled to a 40 Gb/s receiver. FIG. 40 is a plot of Q factor vs. dispersion of the signal input to device 400. Significant Q factor improvement over the uncompensated signal was exhibited over a wide range (>200 ps/nm) of residual dispersions.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A dispersion compensating device for an optical signal having at least one wavelength channel lying within a wavelength range, the dispersion compensating device comprising:

a negative dispersion fiber having an input configured to receive the optical signal, the negative dispersion fiber having a length and a dispersion sufficient to remove any positive chirp from each wavelength channel of the optical signal, thereby outputting a negatively chirped optical signal;

at least one device configured to amplify the negatively chirped optical signal; and a nonlinear positive dispersion fiber having an end configured to receive the amplified negatively chirped optical signal, the nonlinear positive dispersion fiber having a variable dispersion over its length wherein the nonlinear positive dispersion fiber comprises at least two fiber segments operatively coupled to each other with a spectral located filter therebetween, each nonlinear positive dispersion fiber segment having different dispersion properties.

2. The dispersion compensating device of claim 1, the dispersion compensating device further comprising:

a Raman pump source operatively coupled to the nonlinear positive dispersion fiber, the Raman pump source being configured to amplify the optical signal in the nonlinear positive dispersion fiber, wherein the amplification provided by the Raman pump source and the nonlinear positive dispersion fiber is about equivalent to the loss of the nonlinear positive dispersion fiber at a wavelength within the wavelength range.

3. The dispersion compensating device of claim 2 wherein the nonlinear positive dispersion fiber has a total dispersion of at least about 100 ps/nm at a wavelength within the wavelength range.

4. The dispersion compensating device of claim 2 wherein the amplification provided by the Raman pump source and the nonlinear positive dispersion fiber is within about 15% of the loss of the nonlinear positive dispersion fiber at a wavelength within the wavelength range.

5. The dispersion compensating device of claim 1 wherein the nonlinear positive dispersion fiber has decreasing dispersion along its length, and wherein the end of the nonlinear positive dispersion fiber configured to receive the negatively chirped optical signal is the end of the fiber having the largest dispersion.

6. The dispersion compensating device of claim 1, wherein at least one of the segments has a constant dispersion over its length.

7. The dispersion compensating device of claim 1, wherein the nonlinear positive dispersion fiber includes a plurality of segments coupled end-to-end, each segment having an essentially constant dispersion over its length, the segments being arranged in order of dispersion, the highest dispersion segment being located at the end of the nonlinear positive dispersion fiber configured to receive the negatively chirped optical signal.

8. The dispersion compensating device according to claim 1 further comprising a plurality of nonlinear positive dispersion fiber segments, wherein at least some of said fiber segments are being pumped by one or more Raman pump sources.

9. The dispersion compensating device according to claim 1 further comprising a plurality of optical amplifiers, wherein each of said optical amplifiers produces gain sufficient to compensate for loss introduced by associated nonlinear dispersion fiber and spectral filter.

10. The dispersion compensating device of claim 1 wherein the spectral filter is a comb filter.

11. The dispersion compensating device of claim 1, wherein refractive index profile of the nonlinear positive dispersion fiber is designed such that reduced overlap between optical and acoustic modes results in stimulated Brillouin scattering (SBS) threshold higher than 10 mW for fiber length of 10 km.

12. A dispersion compensating device for an optical signal having at least one wavelength channel lying within a wavelength range, the dispersion compensating device comprising:

a negative dispersion fiber having an input configured to receive the optical signal, the negative dispersion fiber having a length and a dispersion sufficient to remove any positive chirp from each wavelength channel of the optical signal, thereby outputting a negatively chirped optical signal;

at least one device configured to amplify the negatively chirped optical signal; and a nonlinear positive dispersion fiber having an end configured to receive the amplified negatively chirped optical signal, the nonlinear positive dispersion fiber having a variable dispersion over its length wherein the nonlinear positive dispersion fiber comprises more than two fiber segments, each of said fiber segments being coupled to a previous fiber segment with a spectral filter located therebetween, each nonlinear positive dispersion fiber segment having different dispersion properties and the dispersion value at the front of each said fiber segment being equal to or lower than the dispersion value at the end of the previous fiber segment.

13. The dispersion compensating device according to claim 1 further comprising a plurality of spectral filters and a plurality of optical amplifiers.

14. The dispersion compensating device according to claim 13 wherein at least one of said plurality of optical amplifiers is a Raman amplifier.

15. A dispersion compensating device for an optical signal having at least one wavelength channel lying within a wavelength range, the dispersion compensating device comprising:
- a negative dispersion fiber having an input configured to receive the optical signal, the negative dispersion fiber having a length and a dispersion sufficient to remove any positive chirp from each wavelength channel of the optical signal, thereby outputting a negatively chirped optical signal;
- a first interleaver configured to receive the negatively chirped optical signal and split the negatively chirped optical signal into a first subset including a first set of wavelength channels, and a second subset including a second set of wavelength channels;
- a first amplifying device configured to amplify the first subset;
- a first nonlinear positive dispersion fiber having an end configured to receive the amplified first subset;
- a second amplifying device configured to amplify the second subset;
- a second nonlinear positive dispersion fiber having an end configured to receive the amplified second subset, wherein at least one of said nonlinear positive dispersion fibers comprises more than two fiber segments, each of said fiber segments being coupled to a previous fiber segment with a spectral filter located therebetween, each nonlinear positive dispersion fiber segment having different dispersion properties and the dispersion value at the front of each said fiber segment being equal to or lower than the dispersion value at the end of the previous fiber segment.

16. The dispersion compensating device of claim 15 further comprising
- a second interleaver configured to receive the first subset from the first nonlinear positive dispersion fiber and the second subset from the second nonlinear positive dispersion fiber, the second interleaver being configured to combine the first and second subsets into an output optical signal.

* * * * *